United States Patent
Pekkucuksen et al.

(10) Patent No.: US 11,062,436 B2
(45) Date of Patent: Jul. 13, 2021

(54) TECHNIQUES FOR COMBINING IMAGE FRAMES CAPTURED USING DIFFERENT EXPOSURE SETTINGS INTO BLENDED IMAGES

(71) Applicant: Samsung Electronics Co., Ltd., Suwon-si (KR)

(72) Inventors: Ibrahim Pekkucuksen, Plano, TX (US); Hamid R. Sheikh, Allen, TX (US); John W. Glotzbach, Allen, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/572,227

(22) Filed: Sep. 16, 2019

(65) Prior Publication Data

US 2020/0357102 A1    Nov. 12, 2020

Related U.S. Application Data

(60) Provisional application No. 62/845,997, filed on May 10, 2019, provisional application No. 62/883,228, filed on Aug. 6, 2019.

(51) Int. Cl.
*G06T 5/50*    (2006.01)
*H04N 5/355*   (2011.01)
(Continued)

(52) U.S. Cl.
CPC ............... *G06T 5/50* (2013.01); *G06T 5/003* (2013.01); *G06T 5/40* (2013.01); *H04N 5/2353* (2013.01);
(Continued)

(58) Field of Classification Search
CPC .. G06T 5/50; G06T 5/003; G06T 5/40; H04N 5/23277; H04N 5/35572; H04N 5/2353
See application file for complete search history.

(56) References Cited

U.S. PATENT DOCUMENTS 6,973,220 B2    12/2005 Sakurai et al.
7,418,150 B2    8/2008  Myoga
(Continued)

FOREIGN PATENT DOCUMENTS

CN    102665034 A    9/2012
CN    103793885 B    7/2016
(Continued)

OTHER PUBLICATIONS

Tico et al., "Motion-Blur-Free Exposure Fusion", Proceedings of 2010 IEEE 17th International Conference on Image Processing, Sep. 2010, 4 pages.
(Continued)

*Primary Examiner* — Gevell V Selby

(57) ABSTRACT

A method for multi-frame blending includes obtaining at least two image frames of a scene. One of the image frames is associated with a shorter exposure time and a higher sensitivity and representing a reference image frame. At least one other of the image frames is associated with a longer exposure time and a lower sensitivity and representing at least one non-reference image frame. The method also includes blending the reference and non-reference image frames into a blended image such that (i) one or more motion regions of the blended image are based more on the reference image frame and (ii) one or more stationary regions of the blended image are based more on the at least one non-reference image frame.

34 Claims, 9 Drawing Sheets

(51) Int. Cl.
*G06T 5/00* (2006.01)
*H04N 5/232* (2006.01)
*G06T 5/40* (2006.01)
*H04N 5/235* (2006.01)

(52) U.S. Cl.
CPC ..... *H04N 5/23277* (2013.01); *H04N 5/35572* (2013.01)

(56) References Cited

U.S. PATENT DOCUMENTS

| | | | |
|---|---|---|---|
| 7,443,443 B2 | 10/2008 | Raskar et al. |
| 7,457,477 B2 | 11/2008 | Petschnigg et al. |
| 7,962,030 B2 | 6/2011 | Trevelyan |
| 8,526,761 B2 | 9/2013 | Kojima et al. |
| 8,848,063 B2 | 9/2014 | Jo et al. |
| 8,866,922 B2 | 10/2014 | Tsubaki |
| 8,953,094 B2 | 2/2015 | Baer |
| 8,971,410 B2 | 3/2015 | Lee et al. |
| 9,007,471 B2 | 4/2015 | Jang |
| 9,024,951 B2 | 5/2015 | Frank et al. |
| 9,081,257 B2 | 7/2015 | Miyazaki |
| 9,154,708 B1 | 10/2015 | Rivard et al. |
| 9,240,038 B2 | 1/2016 | Chen |
| 9,317,909 B2 | 4/2016 | Kim |
| 9,330,446 B2 | 5/2016 | Park |
| 9,438,809 B2 | 9/2016 | Sheikh et al. |
| 9,456,144 B2 | 9/2016 | Miyazaki |
| 9,466,113 B2 | 10/2016 | Pham |
| 9,495,762 B2 | 11/2016 | Shroff et al. |
| 9,571,745 B2 | 2/2017 | Mahowald |
| 10,097,765 B2 | 10/2018 | Sheikh et al. |
| 10,158,797 B2 | 12/2018 | Baghert et al. |
| 10,341,574 B2 | 7/2019 | Cote et al. |
| 2004/0100565 A1 | 5/2004 | Chen et al. |
| 2006/0008171 A1 | 1/2006 | Petschnigg et al. |
| 2006/0050335 A1 | 3/2006 | Dorrell et al. |
| 2007/0024742 A1 | 2/2007 | Raskar et al. |
| 2007/0025717 A1 | 2/2007 | Raskar et al. |
| 2007/0025720 A1 | 2/2007 | Raskar et al. |
| 2007/0263119 A1 | 11/2007 | Shum et al. |
| 2008/0192131 A1 | 8/2008 | Kim et al. |
| 2008/0297621 A1 | 12/2008 | Sun et al. |
| 2010/0053349 A1* | 3/2010 | Watanabe | H04N 5/23248 348/222.1 |
| 2010/0066817 A1 | 3/2010 | Zomet et al. |
| 2010/0091119 A1* | 4/2010 | Lee | H04N 5/235 348/208.4 |
| 2011/0280475 A1 | 11/2011 | Singhal et al. |
| 2011/0292216 A1 | 12/2011 | Fergus et al. |
| 2013/0051700 A1* | 2/2013 | Jo | H04N 5/35581 382/284 |
| 2013/0070965 A1 | 3/2013 | Jang et al. |
| 2013/0107066 A1* | 5/2013 | Venkatraman | H04N 5/23254 348/208.4 |
| 2013/0329015 A1 | 12/2013 | Pulli et al. |
| 2013/0335596 A1 | 12/2013 | Demandolx et al. |
| 2015/0350504 A1 | 12/2015 | Corcoran |
| 2016/0259994 A1 | 9/2016 | Ravindran et al. |
| 2016/0323518 A1 | 11/2016 | Rivard et al. |
| 2017/0039686 A1 | 2/2017 | Miura et al. |
| 2017/0148142 A1 | 5/2017 | Park |
| 2017/0201692 A1 | 7/2017 | Wu |
| 2018/0025257 A1 | 1/2018 | van den Oord et al. |
| 2018/0095342 A1* | 4/2018 | Mogami | H04N 5/232123 |
| 2018/0137643 A1 | 5/2018 | Wang |
| 2018/0192098 A1 | 7/2018 | Pekkucuksen et al. |
| 2019/0052790 A1 | 2/2019 | Kang et al. |

FOREIGN PATENT DOCUMENTS

| | | |
|---|---|---|
| CN | 106791382 A | 5/2017 |
| CN | 106934769 A | 7/2017 |
| JP | 2007228099 A | 9/2007 |
| JP | 2008277896 A | 11/2008 |
| JP | 2008294785 A | 12/2008 |
| JP | 2010039832 A | 2/2010 |
| JP | 2012119840 A | 6/2012 |
| JP | 2016019196 A | 2/2016 |
| JP | 2016163327 A | 9/2016 |
| JP | 6333095 B2 | 5/2018 |
| KR | 1020080076004 A | 8/2008 |
| KR | 1020130031574 A | 3/2013 |
| KR | 10-2014-0009706 A | 1/2014 |
| KR | 101378333 B1 | 3/2014 |
| KR | 101633893 B1 | 6/2016 |
| KR | 20160127606 A | 11/2016 |
| KR | 101699919 B1 | 1/2017 |
| WO | 2017099150 A1 | 6/2017 |

OTHER PUBLICATIONS

Li et al., "An Improved FAST+SURF Fast Matching Algorithm", Procedia Computer Science 107, International Congress of Information and Communication Technology, 2017, 7 pages.

Li et al., "Multi-exposure high dynamic range image synthesis with camera shake correction", Proceedings of SPIE, Applied Optics and Photonics China, 2017, 6 pages.

Swathi, "Satellite Image Co-Registration Based on Hybrid Invariant Local Features", Journal of Theoretical and Applied Information Technology, vol. 95, No. 15, Aug. 2017, 9 pages.

Zhen et al., "System and Method for Compositing High Dynamic Range Images", U.S. Appl. No. 16/277,630, filed Feb. 15, 2019, 53 pages.

Kim et al., "Online Video Deblurring via Dynamic Temporal Blending Network", Computer Vision Foundation, Apr. 2017, pp. 4038-4047.

Joshi et al., "Seeing Mt. Rainier: Lucky Imaging for Multi-Image Denoising, Sharpening, and Haze Removal", 2010 IEEE International Conference on Computational Photography (ICCP), Mar. 2010, 8 pages.

Kalantari et al. "Deep High Dynamic Range Imaging of Dynamic Scenes", ACM Transactions on Graphics, vol. 36, No. 4, Article 144, Jul. 2017, 12 pages.

Tezcan, "Motion Estimation Using Convolutional Neural Networks", Boston University, Department of Electrical and Computer Engineering, Technical Report No. ECE-2017-04, Dec. 2017, 30 pages.

Gelfand et al., "Multi-exposure Imaging on Mobile Devices", MM'10, Oct. 2010, pp. 823-826.

Kingma et al., "Adam: A Method for Stochastic Optimization", ICLR 2015, Jan. 2017, 15 pages.

Hasinoff et al., "Burst Photography for High Dynamic Range and Low-Light Imaging on Mobile Cameras", ACM Trans. Graph., vol. 35, No. 6, Article 192, Nov. 2016, pp. 192-192:12.

Fischer et al., "FlowNet: Learning Optical Flow with Convolutional Networks", May 2015, 13 pages.

Ilg et al., "FlowNet 2.0: Evolution of Optical Flow Estimation with Deep Networks", University of Freiburg, Germany, Dec. 2016, 16 pages.

Hu et al., "Techniques for Convolutional Neural Network-Based Multi-Exposure Fusion of Multiple Image Frames and for Deblurring Multiple Image Frames", U.S. Appl. No. 16/278,512, filed Feb. 18, 2019, 81 pages.

Le et al., "Apparatus and Method for Generating Low-Light Images With Improved Bokeh Using Mobile Electronic Device", U.S. Appl. No. 16/278,581, filed Feb. 18, 2019, 52 pages.

Le et al., "Apparatus and Method for Capturing and Blending Multiple Images for High-Quality Flash Photography Using Mobile Electronic Device", U.S. Appl. No. 16/278,543, filed Feb. 18, 2019, 58 pages.

International Search Report and Written Opinion of the International Searching Authority in connection with International Patent Application No. PCT/KR2020/005970 dated Aug. 13, 2020, 11 pages.

* cited by examiner

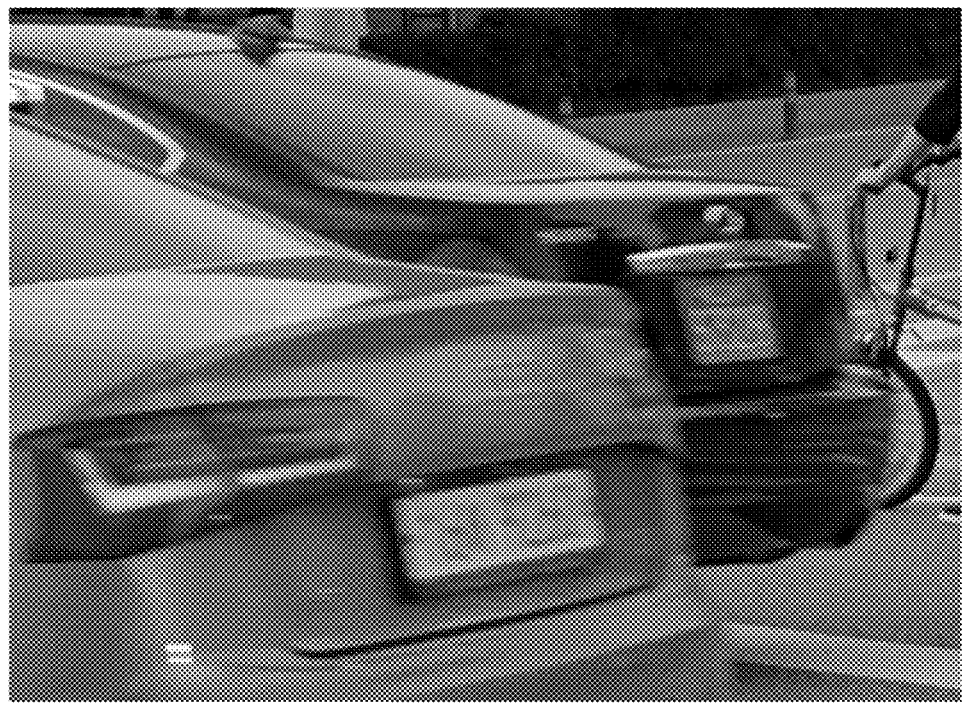
FIG. 11A  ↳1100
FIG. 11B  ↳1102

TECHNIQUES FOR COMBINING IMAGE FRAMES CAPTURED USING DIFFERENT EXPOSURE SETTINGS INTO BLENDED IMAGES

CROSS-REFERENCE TO RELATED APPLICATIONS AND PRIORITY CLAIM

This application claims priority under 35 U.S.C. § 119(e) to U.S. Provisional Patent Application No. 62/845,997 filed on May 10, 2019 and U.S. Provisional Patent Application No. 62/883,228 filed on Aug. 6, 2019. Both of these provisional patent applications are hereby incorporated by reference in their entirety.

TECHNICAL FIELD

This disclosure relates generally to image capturing systems. More specifically, this disclosure relates to techniques for combining image frames captured using different exposure settings into blended images.

BACKGROUND

Many mobile electronic devices, such as smartphones and tablet computers, include cameras that can be used to capture still and video images. While convenient, cameras on mobile electronic devices typically suffer from a number of shortcomings. For example, images captured of action scenes are typically prone to motion blur, which refers to the blurring or smearing of one or more moving objects in a scene. The amount of motion blur in images could be reduced by decreasing the exposure times used to capture the images, but unfortunately this also increases the noise level in the captured images. As another example, images of certain scenes can be prone to contour artifacts, which refer to the creation of false contours in regions of an image having fewer image details. Contour artifacts can be particularly noticeable when they occur across people's faces or skin or when they occur around objects that are set against a generally-consistent background.

SUMMARY

This disclosure provides techniques for combining image frames captured using different exposure settings into blended images.

In a first embodiment, a method for multi-frame blending includes obtaining at least two image frames of a scene. One of the image frames is associated with a shorter exposure time and a higher sensitivity and represents a reference image frame. At least one other of the image frames is associated with a longer exposure time and a lower sensitivity and represents at least one non-reference image frame. The method also includes blending the reference and non-reference image frames into a blended image such that (i) one or more motion regions of the blended image are based more on the reference image frame and (ii) one or more stationary regions of the blended image are based more on the at least one non-reference image frame.

In a second embodiment, an electronic device includes at least one image sensor and at least one processor. The at least one processor is configured to obtain at least two image frames of a scene using the at least one image sensor. One of the image frames is associated with a shorter exposure time and a higher sensitivity and represents a reference image frame. At least one other of the image frames is associated with a longer exposure time and a lower sensitivity and represents at least one non-reference image frame. The at least one processor is also configured to blend the reference and non-reference image frames into a blended image such that (i) one or more motion regions of the blended image are based more on the reference image frame and (ii) one or more stationary regions of the blended image are based more on the at least one non-reference image frame.

In a third embodiment, a method for contour reduction includes obtaining a blended image that is generated by combining a reference image frame and multiple non-reference image frames. The method also includes identifying where motion maps associated with the non-reference image frames do or do not consistently identify motion relative to the reference frame. The method further includes identifying pixels or regions of the blended image in which to apply contour reduction based on where the motion maps do not consistently identify motion. In addition, the method includes applying contour reduction to the identified pixels or regions to produce a processed blended image.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used here, terms and phrases such as "have," "may have," "include," or "may include" a feature (like a number, function, operation, or component such as a part) indicate the existence of the feature and do not exclude the existence of other features. Also, as used here, the phrases "A or B," "at least one of A and/or B," or "one or more of A and/or B"

may include all possible combinations of A and B. For example, "A or B," "at least one of A and B," and "at least one of A or B" may indicate all of (1) including at least one A, (2) including at least one B, or (3) including at least one A and at least one B. Further, as used here, the terms "first" and "second" may modify various components regardless of importance and do not limit the components. These terms are only used to distinguish one component from another. For example, a first user device and a second user device may indicate different user devices from each other, regardless of the order or importance of the devices. A first component may be denoted a second component and vice versa without departing from the scope of this disclosure.

It will be understood that, when an element (such as a first element) is referred to as being (operatively or communicatively) "coupled with/to" or "connected with/to" another element (such as a second element), it can be coupled or connected with/to the other element directly or via a third element. In contrast, it will be understood that, when an element (such as a first element) is referred to as being "directly coupled with/to" or "directly connected with/to" another element (such as a second element), no other element (such as a third element) intervenes between the element and the other element.

As used here, the phrase "configured (or set) to" may be interchangeably used with the phrases "suitable for," "having the capacity to," "designed to," "adapted to," "made to," or "capable of" depending on the circumstances. The phrase "configured (or set) to" does not essentially mean "specifically designed in hardware to." Rather, the phrase "configured to" may mean that a device can perform an operation together with another device or parts. For example, the phrase "processor configured (or set) to perform A, B, and C" may mean a generic-purpose processor that is a hardware device (such as a CPU or application processor) that may perform the operations by executing one or more software programs stored in a memory device or a dedicated processor that is a hardware device (such as an embedded processor) for performing the operations.

The terms and phrases as used here are provided merely to describe some embodiments thereof, but not to limit the scope of other embodiments of this disclosure. It is to be understood that the singular forms "a," "an," and "the" include plural references unless the context clearly dictates otherwise. All terms and phrases, including technical and scientific terms and phrases, used here have the same meanings as commonly understood by one of ordinary skill in the art to which the embodiments of this disclosure belong. It will be further understood that terms and phrases, such as those defined in commonly used dictionaries, should be interpreted as having a meaning that is consistent with their meaning in the context of the relevant art and will not be interpreted in an idealized or overly formal sense unless expressly so defined here. In some cases, the terms and phrases defined here may be interpreted to exclude embodiments of this disclosure.

Examples of an "electronic device" according to embodiments of this disclosure may include at least one of a smartphone, a tablet personal computer (PC), a mobile phone, a video phone, an e-book reader, a desktop PC, a laptop computer, a netbook computer, a workstation, a personal digital assistant (PDA), a portable multimedia player (PMP), an MP3 player, a mobile medical device, a camera, or a wearable device (such as smart glasses, a head-mounted device (HMD), electronic clothes, an electronic bracelet, an electronic necklace, an electronic appcessory, an electronic tattoo, a smart mirror, or a smart watch).

Definitions for other certain words and phrases may be provided throughout this patent document. Those of ordinary skill in the art should understand that in many if not most instances, such definitions apply to prior as well as future uses of such defined words and phrases.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the Applicant to refer to structures known to those skilled in the relevant art and is not intended to invoke 35 U.S.C. § 112(f).

BRIEF DESCRIPTION OF THE DRAWINGS

For a more complete understanding of this disclosure and its advantages, reference is now made to the following description taken in conjunction with the accompanying drawings, in which like reference numerals represent like parts:

FIGS. 11A and 11B illustrate an example result obtained by blending multiple image frames captured using different exposure settings in accordance with this disclosure.

DETAILED DESCRIPTION

Figure 1:
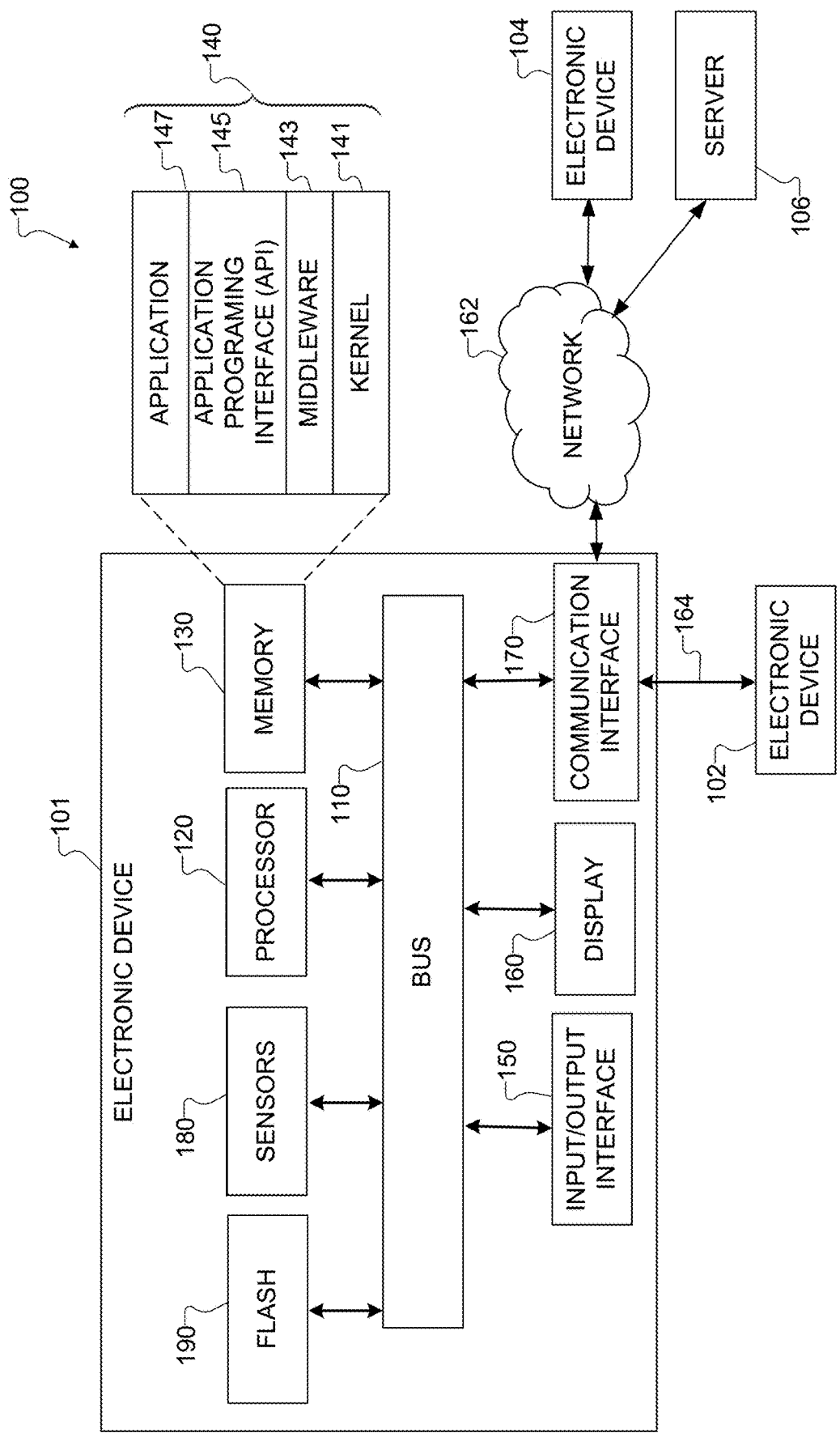
FIG. 1 illustrates an example network configuration including an electronic device in accordance with this disclosure.

FIGS. 1 through 12B, discussed below, and the various embodiments of this disclosure are described with reference to the accompanying drawings. However, it should be appreciated that this disclosure is not limited to these embodiments, and all changes and/or equivalents or replacements thereto also belong to the scope of this disclosure. The same or similar reference denotations may be used to refer to the same or similar elements throughout the specification and the drawings.

As noted above, cameras in many mobile electronic devices suffer from a number of shortcomings. For example, images captured of action scenes are typically prone to motion blur, and one possible solution (decreasing the exposure time used to capture an image) may reduce motion blur but increase noise. Motion blur can be particularly problematic in low-light environments, since exposure times used for capturing images in low-light environments need to be increased in order to ensure that an adequate amount of light is sensed. As another example, images of certain scenes can be prone to contour artifacts, which may be particularly noticeable when the artifacts occur across people's faces or skin or when they occur around objects that are set against a generally-consistent background. Reducing or minimizing contour artifacts is a non-trivial task.

This disclosure provides techniques for blending multiple image frames that are captured using different exposure settings. As described in more detail below, an image frame is captured using a shorter exposure time and a higher sensitivity and can be used as a reference frame, and one or more additional image frames are captured using a longer exposure time and a lower sensitivity (such as before, after, or before and after the shorter-exposure image frame is captured). The shorter-exposure image frame may have fewer image details in regions where little or no motion is occurring compared to the longer-exposure image frame(s), but the shorter-exposure image frame may have little or no motion blur in regions where motion is occurring. Conversely, the longer-exposure image frame(s) may have greater image details in regions where little or no motion is occurring compared to the shorter-exposure image frame, but the longer-exposure image frame(s) may have more motion blur in regions where motion is occurring. Thus, the techniques described in this disclosure allow multiple image frames, at least some of which are captured using different exposure settings, to be combined in order to produce a blended image having reduced/minimal motion blur and reduced/minimal noise. Among other things, this is accomplished using histogram matching with effective motion pixel rejection to reduce or minimize photometric differences between the image frames, and the histogram matching can occur multiple times using different ones of the longer-exposure image frames (if available) with the shorter-exposure image frame.

In this way, different image frames can be optimized for different desirable characteristics, such as by (i) capturing one or more objects with reduced or minimal motion blur using a shorter exposure time and (ii) increasing or maximizing image details by decreasing or minimizing noise using a longer exposure time. Essentially, this allows primarily the best regions from the different image frames to be combined while suppressing primarily the worst regions of the image frames during the combination. In the context of reducing motion blur, this can involve primarily using the regions of the shorter-exposure image frame in which motion is occurring (referred to as "motion regions" of an image frame) and regions of the longer-exposure image frame(s) in which little or no motion is occurring (referred to as "stationary regions" of an image frame). Transitions between the regions from the different image frames can be handled gracefully to improve the transitions between the regions in the blended image. It should be noted here that while motion blur reduction is one possible use of the multi-exposure image frame blending techniques disclosed in this patent document, other applications of the multi-exposure image frame blending techniques are also possible.

This disclosure also provides techniques for contour reduction in blended images, which may or may not be used with the multi-exposure image frame blending techniques described in this disclosure. In fact, the techniques for contour reduction can be used with various approaches in which multiple image frames are combined to produce a blended image, regardless of whether the multiple image frames are captured using common or different exposure settings. As described in more detail below, a blended image that is produced by combining multiple image frames (in whatever manner) is analyzed to isolate and reject contour artifacts only in specific regions where the contour artifacts are likely to occur. This is done so that regions in the blended image associated with motion regions have reduced or minimal contour artifacts while avoiding the application of contour reduction to regions where contour artifacts are not likely to occur (which can unnecessarily reduce image quality). In this way, these techniques for contour reduction can produce more pleasing images of scenes with fewer distracting artifacts.

Note that while these techniques are often described below as being performed using a mobile electronic device, other electronic devices could also be used to perform or support these techniques. Thus, these techniques could be used in various types of electronic devices. Also, while the techniques described below are often described as processing image frames when capturing still images of a scene, the same or similar approaches could be used to support the capture of video images.

FIG. 1 illustrates an example network configuration 100 including an electronic device in accordance with this disclosure. The embodiment of the network configuration 100 shown in FIG. 1 is for illustration only. Other embodiments of the network configuration 100 could be used without departing from the scope of this disclosure.

According to embodiments of this disclosure, an electronic device 101 is included in the network configuration 100. The electronic device 101 can include at least one of a bus 110, a processor 120, a memory 130, an input/output (I/O) interface 150, a display 160, a communication interface 170, or a sensor 180. In some embodiments, the electronic device 101 may exclude at least one of these components or may add at least one other component. The bus 110 includes a circuit for connecting the components 120-180 with one another and for transferring communications (such as control messages and/or data) between the components.

The processor 120 includes one or more of a central processing unit (CPU), an application processor (AP), or a communication processor (CP). The processor 120 is able to perform control on at least one of the other components of the electronic device 101 and/or perform an operation or data processing relating to communication. In some embodiments, the processor 120 can be a graphics processor unit (GPU). For example, the processor 120 can receive image data captured by at least one camera. Among other things, the processor 120 can process the image data (as discussed in more detail below) to blend multiple image frames that are captured using different exposure settings. The processor 120 can also or alternatively process the image data (as discussed in more detail below) to provide contour reduction.

The memory 130 can include a volatile and/or non-volatile memory. For example, the memory 130 can store commands or data related to at least one other component of the electronic device 101. According to embodiments of this disclosure, the memory 130 can store software and/or a program 140. The program 140 includes, for example, a kernel 141, middleware 143, an application programming interface (API) 145, and/or an application program (or "application") 147. At least a portion of the kernel 141, middleware 143, or API 145 may be denoted an operating system (OS).

The kernel 141 can control or manage system resources (such as the bus 110, processor 120, or memory 130) used to perform operations or functions implemented in other programs (such as the middleware 143, API 145, or application program 147). The kernel 141 provides an interface that allows the middleware 143, the API 145, or the application 147 to access the individual components of the electronic device 101 to control or manage the system resources. The application 147 includes one or more applications for image capture and image processing as discussed below. These functions can be performed by a single application or by multiple applications that each carries out one or more of these functions. The middleware 143 can function as a relay to allow the API 145 or the application 147 to communicate data with the kernel 141, for instance. A plurality of applications 147 can be provided. The middleware 143 is able to control work requests received from the applications 147, such as by allocating the priority of using the system resources of the electronic device 101 (like the bus 110, the processor 120, or the memory 130) to at least one of the plurality of applications 147. The API 145 is an interface allowing the application 147 to control functions provided from the kernel 141 or the middleware 143. For example, the API 145 includes at least one interface or function (such as a command) for filing control, window control, image processing, or text control.

The I/O interface 150 serves as an interface that can, for example, transfer commands or data input from a user or other external devices to other component(s) of the electronic device 101. The I/O interface 150 can also output commands or data received from other component(s) of the electronic device 101 to the user or the other external device.

The display 160 includes, for example, a liquid crystal display (LCD), a light emitting diode (LED) display, an organic light emitting diode (OLED) display, a quantum-dot light emitting diode (QLED) display, a microelectromechanical systems (MEMS) display, or an electronic paper display. The display 160 can also be a depth-aware display, such as a multi-focal display. The display 160 is able to display, for example, various contents (such as text, images, videos, icons, or symbols) to the user. The display 160 can include a touchscreen and may receive, for example, a touch, gesture, proximity, or hovering input using an electronic pen or a body portion of the user.

The communication interface 170, for example, is able to set up communication between the electronic device 101 and an external electronic device (such as a first electronic device 102, a second electronic device 104, or a server 106). For example, the communication interface 170 can be connected with a network 162 or 164 through wireless or wired communication to communicate with the external electronic device. The communication interface 170 can be a wired or wireless transceiver or any other component for transmitting and receiving signals, such as images.

The electronic device 101 further includes one or more sensors 180 that can meter a physical quantity or detect an activation state of the electronic device 101 and convert metered or detected information into an electrical signal. For example, one or more sensors 180 can include one or more buttons for touch input, one or more cameras, a gesture sensor, a gyroscope or gyro sensor, an air pressure sensor, a magnetic sensor or magnetometer, an acceleration sensor or accelerometer, a grip sensor, a proximity sensor, a color sensor (such as a red green blue (RGB) sensor), a bio-physical sensor, a temperature sensor, a humidity sensor, an illumination sensor, an ultraviolet (UV) sensor, an electromyography (EMG) sensor, an electroencephalogram (EEG) sensor, an electrocardiogram (ECG) sensor, an infrared (IR) sensor, an ultrasound sensor, an iris sensor, or a fingerprint sensor. The sensor(s) 180 can also include an inertial measurement unit, which can include one or more accelerometers, gyroscopes, and other components. The sensor(s) 180 can further include a control circuit for controlling at least one of the sensors included here. Any of these sensor(s) 180 can be located within the electronic device 101. The one or more cameras can optionally be used in conjunction with at least one flash 190. The flash 190 represents a device configured to generate illumination for use in image capture by the electronic device 101, such as one or more LEDs.

The first external electronic device 102 or the second external electronic device 104 can be a wearable device or an electronic device-mountable wearable device (such as an HMD). When the electronic device 101 is mounted in the electronic device 102 (such as the HMD), the electronic device 101 can communicate with the electronic device 102 through the communication interface 170. The electronic device 101 can be directly connected with the electronic device 102 to communicate with the electronic device 102 without involving with a separate network. The electronic device 101 can also be an augmented reality wearable device, such as eyeglasses, that include one or more cameras.

The wireless communication is able to use at least one of, for example, long term evolution (LTE), long term evolution-advanced (LTE-A), 5th generation wireless system (5G), millimeter-wave or 60 GHz wireless communication, Wireless USB, code division multiple access (CDMA), wideband code division multiple access (WCDMA), universal mobile telecommunication system (UMTS), wireless broadband (WiBro), or global system for mobile communication (GSM), as a cellular communication protocol. The wired connection can include, for example, at least one of a universal serial bus (USB), high definition multimedia interface (HDMI), recommended standard 232 (RS-232), or plain old telephone service (POTS). The network 162 includes at least one communication network, such as a computer network (like a local area network (LAN) or wide area network (WAN)), Internet, or a telephone network.

The first and second external electronic devices 102 and 104 and server 106 each can be a device of the same or a different type from the electronic device 101. According to certain embodiments of this disclosure, the server 106 includes a group of one or more servers. Also, according to certain embodiments of this disclosure, all or some of the operations executed on the electronic device 101 can be executed on another or multiple other electronic devices (such as the electronic devices 102 and 104 or server 106). Further, according to certain embodiments of this disclosure, when the electronic device 101 should perform some function or service automatically or at a request, the electronic device 101, instead of executing the function or service on its own or additionally, can request another device (such as electronic devices 102 and 104 or server 106) to perform at least some functions associated therewith. The other electronic device (such as electronic devices 102 and 104 or server 106) is able to execute the requested functions or additional functions and transfer a result of the execution to the electronic device 101. The electronic device 101 can provide a requested function or service by processing the received result as it is or additionally. To that end, a cloud computing, distributed computing, or client-server computing technique may be used, for example. While FIG. 1 shows that the electronic device 101 includes the communication interface 170 to communicate with the external electronic device 104 or server 106 via the network 162, the electronic device 101 may be independently operated without a separate communication function according to some embodiments of this disclosure.

The server 106 can optionally support the electronic device 101 by performing or supporting at least one of the operations (or functions) implemented on the electronic device 101. For example, the server 106 can include a processing module or processor that may support the processor 120 implemented in the electronic device 101.

Although FIG. 1 illustrates one example of a network configuration 100 including an electronic device 101, various changes may be made to FIG. 1. For example, the network configuration 100 could include any number of each component in any suitable arrangement. In general, computing and communication systems come in a wide variety of configurations, and FIG. 1 does not limit the scope of this disclosure to any particular configuration. Also, while FIG. 1 illustrates one operational environment in which various features disclosed in this patent document can be used, these features could be used in any other suitable system.

Figure 2:
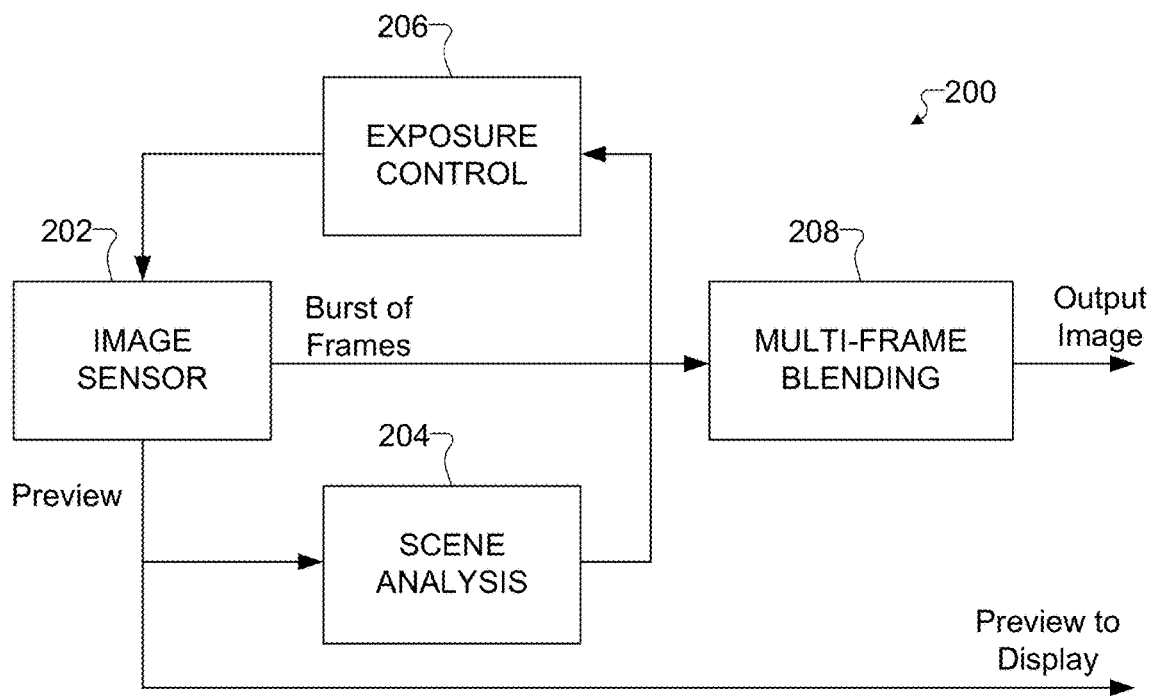
FIG. 2 illustrates an example process for blending multiple image frames captured using different exposure settings in accordance with this disclosure.

FIG. 2 illustrates an example process 200 for blending multiple image frames captured using different exposure settings in accordance with this disclosure. For ease of explanation, the process 200 shown in FIG. 2 is described as involving the use of the electronic device 101 of FIG. 1. However, the process 200 shown in FIG. 2 could be used with any other suitable electronic device and in any suitable system.

As shown in FIG. 2, the process 200 involves the use of at least one image sensor 202, which could represent one or more sensors 180 in at least one camera of the electronic device 101. The image sensor 202 can be used to capture preview image frames and bursts of image frames associated with a scene. Any suitable image sensor 202 can be used here. The preview image frames are typically output to a display, such as the display 160 of the electronic device 101, so that a user can view the preview image frames and determine if and when to initiate capture of a burst of image frames.

The preview image frames are also provided to a scene analysis operation 204, which generally operates to identify a baseline exposure time (often denoted EV+0) to be used to capture image frames of the scene. For example, in some embodiments, the scene analysis operation 204 could receive the exposure time that an auto-exposure (AE) algorithm determines is appropriate for the scene based on the light level of the scene. The AE algorithm typically selects the exposure time in an attempt to balance a captured image frame in terms of brightness (meaning the captured image frame has minimal under-exposed and over-exposed pixels). The scene analysis operation 204 could therefore operate to identify the baseline exposure time based on the light level in the image sensor's field of view just before an actual frame capture operation takes place.

The baseline exposure time determined by the scene analysis operation 204 is provided to an exposure control operation 206, which generally operates to identify the number of image frames to be captured and the exposure settings to be used when capturing those image frames. For example, to support a multi-exposure image frame blending technique as described below, the exposure control operation 206 could determine that the image sensor 202 should capture one or more image frames at the baseline exposure time (EV+0) and at least one image frame at ½ exposure time (EV−1), ¼ exposure time (EV−2), or ⅛ exposure time (EV−3). Also, the exposure control operation 206 can determine the order in which the image sensor 202 is used to capture the longer-exposure and shorter-exposure image frames. In some embodiments, the exposure control operation 206 could determine that the image sensor 202 should capture at least one shorter-exposure image frame before one or more longer-exposure image frames are captured. In other embodiments, the exposure control operation 206 could determine that the image sensor 202 should capture at least one shorter-exposure image frame after one or more longer-exposure image frames are captured. In still other embodiments, the exposure control operation 206 could determine that the image sensor 202 should capture at least one shorter-exposure image frame in between the capture of at least two of the longer-exposure image frames, meaning the shorter-exposure image frame has a capture time positioned in between the capture times of the longer-exposure image frames. The sensitivity of the image sensor 202 can also be controlled by the exposure control operation 206 during the image capture, namely by using a higher ISO level or other higher sensitivity for shorter-exposure image capture (to provide higher gain) and by using a lower ISO level or other lower sensitivity for longer-exposure image capture (to provide lower gain). In some embodiments, the use of different ISO levels or other sensitivities can help the captured image frames to have more similar or substantially equal brightness levels. In particular embodiments, the exposure times and sensitivities can be selected so that a ratio between the longer and shorter exposure times substantially matches a ratio between the higher and lower sensitivities. The exposure control operation 206 can control the image sensor 202 to capture the image frames at these determined exposure times and in this order when capturing a burst of image frames. Of course, to support other types of image capture operations, the exposure control operation 206 can determine other exposure times and numbers of image frames to capture. For instance, the exposure control operation 206 could also support the capture of multiple image frames using common exposure settings, where those image frames are then combined.

The image frames captured by the image sensor 202 in the burst are provided to a multi-frame blending operation 208, which generally processes the captured image frames to produce at least one final image of a scene with minimal or no motion blur. As described in more detail below, when blending image frames captured using different exposure settings, the blending operation 208 identifies motion regions in a reference image frame (which represents a shorter-exposure image frame), where those motion regions represent areas prone to blurring due to motion. Motion regions are prone to blurring especially under low light because the exposure time increases as the light level decreases. The blending operation 208 can compare the reference image frame to one or more non-reference image frames (which represent one or more longer-exposure image frames), possibly during multiple histogram matching operations if there are multiple non-reference image frames available. The blending operation 208 can also generate one or more motion maps based on the reference and non-reference image frames and blend the reference and non-reference image frames based on the histogram matching and the motion map(s). The blending operation 208 can also or alternatively perform contour reduction in a blended image frame. Example implementations of the blending operation 208 and the contour reduction operation are described below, although other implementations of the blending operation 208 and the contour reduction operation could also be used.

Figure 3:
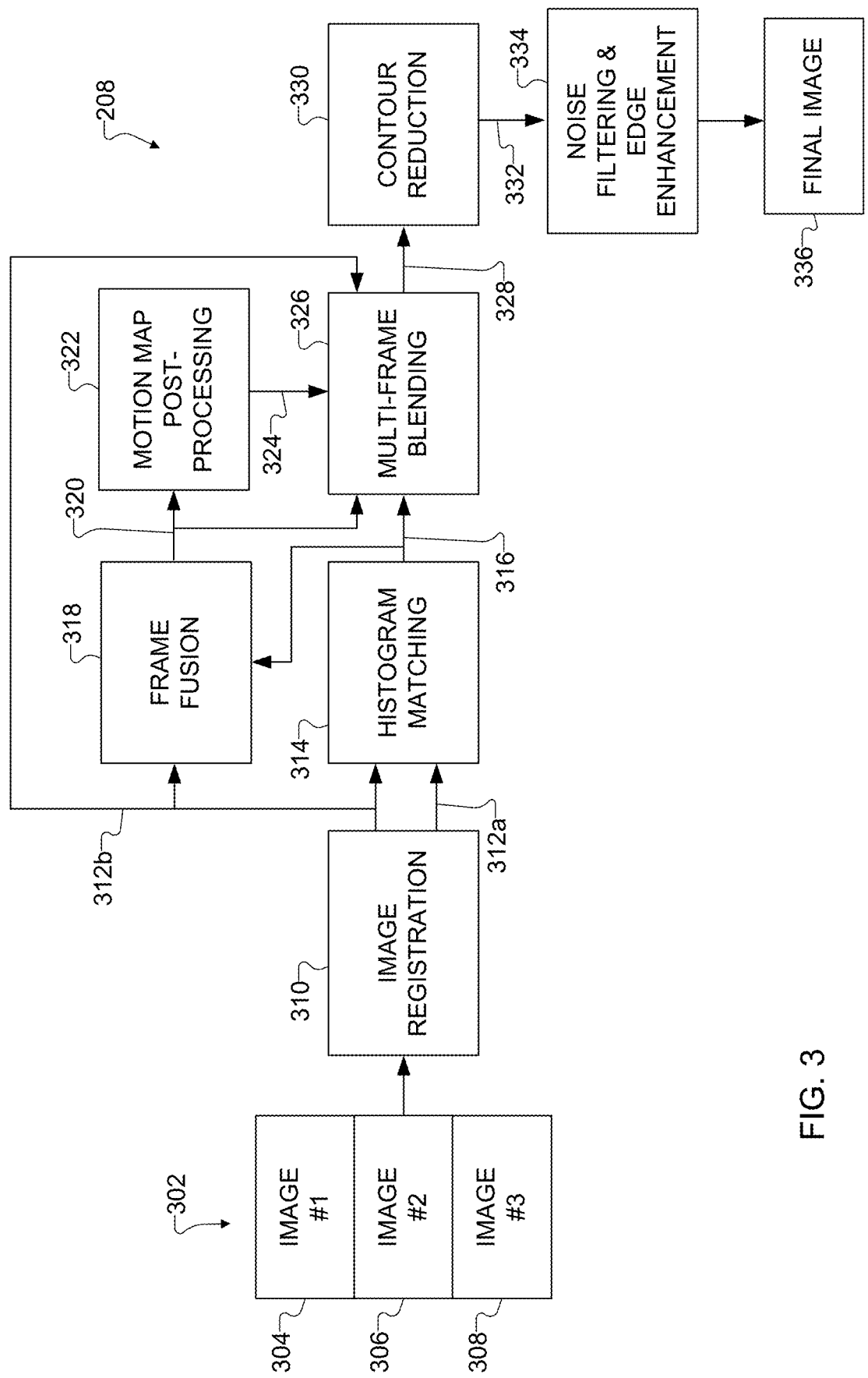
FIG. 3 illustrates an example process for performing a multi-frame blending operation in the process of FIG. 2 in accordance with this disclosure.

FIG. 3 illustrates an example process for performing a multi-frame blending operation 208 in the process of FIG. 2 in accordance with this disclosure. As shown in FIG. 3, a collection 302 of image frames is captured using the at least one image sensor 202, such as in the camera(s) of the electronic device 101. Here, the collection 302 includes at least three image frames 304, 306, and 308, although two or more than three image frames may be used in the collection 302. The image frames 304 and 308 are captured using a longer exposure time, such as an EV+0 exposure time, and a lower sensitivity. The image frame 306 is captured using a shorter exposure time relative to the image frames 304 and 308, such as an EV−1, EV−2, or EV−3 exposure time, and using a higher sensitivity relative to the image frames 304 and 308. Here, the image frame 306 having the shorter exposure time can be captured in between captures of the longer-exposure image frames 304 and 308.

As noted above, however, other numbers of image frames could be captured, and other numbers of exposure settings could be used. As one example, one or more image frames 304 having a longer exposure time and a lower sensitivity may be captured before the image frame 306 is captured (without any image frame 308 captured after the image frame 306), or one or more image frames 308 having a longer exposure time and a lower sensitivity may be captured after the image frame 306 is captured (without any image frame 304 captured before the image frame 306). As another example, multiple image frames 304 having a longer exposure time and a lower sensitivity may be captured before the image frame 306 is captured, and multiple image frames 308 having a longer exposure time and a lower sensitivity may be captured after the image frame 306 is captured. As a particular example, two or more longer-exposure image frames 304 could be captured before the shorter-exposure image frame 306, and two or more longer-exposure image frames 308 could be captured after the shorter-exposure image frame 306. As yet another example, multiple shorter-exposure image frames could be captured, and one of the shorter-exposure image frames can be selected for use during subsequent processing, such as by selecting the shorter-exposure image frame having the least amount of motion blur. During the following discussion, it may often be assumed that multiple non-reference image frames 304 and 308 are processed, although suitable modifications can easily be made by one skilled in the art if different numbers of non-reference image frames (including a single non-reference image frame) are used.

The image frame collection 302 is provided to an image registration operation 310, which operates to align the image frames 304, 306, and 308 and produce aligned image frames. Alignment may be needed if the electronic device 101 moves or rotates between image captures and causes objects in the image frames 304, 306, and 308 to move or rotate slightly, which is common with handheld devices. The image frames 304, 306, and 308 here can be aligned both geometrically and photometrically, such as by modifying the one or more non-reference image frames 304 and 308 to align with the reference image frame 306. The aligned versions of the image frames include a reference image frame 312a (which represents an aligned version of the reference image frame 306) and one or more non-reference image frames 312b (which represent aligned versions of the one or more non-reference image frames 304 and 308). Note that the reference image frame 306 here may or may not be modified during the alignment (meaning the image frame 312a may match the image frame 306), and the one or more non-reference image frames 304 and 308 could represent the only image frames modified during the alignment. The image registration operation 310 can use any suitable technique to align image frames, and various alignment techniques are known in the art. In some embodiments, the image registration operation 310 can use global Oriented FAST and Rotated BRIEF (ORB) features and local features from a block search to align the image frames, although other implementations of the image registration operation 310 could also be used.

The aligned image frames 312a-312b are provided to a histogram matching operation 314. The histogram matching operation 314 operates to more closely match a histogram of the reference image frame 312a to one or more histograms of the one or more non-reference image frames 312b, such as by applying a suitable transfer function to the reference image frame 312a. As a particular example, the histogram matching operation 314 may operate to make the brightness and color generally equal for all of the image frames 312a-312b by modifying the reference image frame 312a. This results in the generation of a pre-processed aligned reference image frame 316. After image registration and histogram matching, the scene content in the image frames 312b, 316 is expected to match closely, except for moving objects in the scene. As described in more detail below, the histogram matching operation 314 may include performing multiple histogram matching map generation operations using different ones of the non-reference image frames 312b with the reference image frame 316 (assuming there are multiple non-reference image frames 312b), which helps to identify photometric differences between the image frames 312a-312b. One example implementation of the histogram matching operation 314 is described below, although other implementations of the histogram matching operation 314 could also be used.

The one or more aligned non-reference image frames 312b and the pre-processed aligned reference image frame 316 are provided to a frame fusion operation 318, which operates to compare each non-reference image frame 312b with the reference image frame 316. For each comparison between one non-reference image frame and the reference image frame, the frame fusion operation 318 generates a motion map 320 that identifies local differences between the two image frames being compared. Since the image frames being compared here have been previously aligned, the local differences between two image frames being compared are indicative of motion occurring between the two image frames. The frame fusion operation 318 can use any suitable technique to generate motion maps or other data identifying differences between image frames, and various techniques are known in the art. As a particular example, the frame fusion operation 318 can use the techniques disclosed in U.S. Patent Application Publication No. 2018/0192098 (which is hereby incorporated by reference in its entirety) to generate each of the motion maps 320.

In some embodiments, the frame fusion operation 318 can generate n motion maps 320 for n image frames 312b, 316. One motion map 320 can be generated for each non-reference image frame 312b by comparing that non-reference image frame 312b to the reference image frame 316. For example, if there are three original image frames (one longer-exposure, one shorter-exposure, and another longer-exposure), the frame fusion operation 318 can generate two motion maps 320, where each motion map 320 is based on a comparison of the shorter-exposure image frame and one of the two longer-exposure image frames. If there are five original image frames (two longer-exposure, one shorter-exposure, and another two longer-exposure), the frame fusion operation 318 can generate four motion maps 320, where each motion map 320 is based on a comparison of the shorter-exposure image frame and one of the four longer-exposure image frames. An additional motion map 320 can be associated with the reference image frame 316 itself, and (since the image frame 316 compared to itself will have no differences) can be populated with values indicating that no motion is detected.

The motion maps 320 generated by the frame fusion operation 318 are provided to a motion map post-processing operation 322, which modifies the motion map 320 associated with the reference image frame 316 to support improved blending of the reference and non-reference image frames 312b, 316. For example, the motion map post-processing operation 322 can analyze the motion maps 320 and determine how to modify the motion map 320 associated with the reference image frame 316 so that the contribution of the reference image frame 316 is reduced or minimized when blending image frames. In other words, the motion map post-processing operation 322 can reduce or minimize the image data from the shorter-exposure image frame 306 that is used in a final image, which helps to improve or maximize noise reduction in the final image (since the image frame 306 has a shorter exposure time and therefore more noise than the other image frames 304 and 308). This results in the generation of a post-processed motion map 324, which represents the modified motion map that is associated with the reference image frame 316. One example implementation of the motion map post-processing operation 322 is described below, although other implementations of the motion map post-processing operation 322 could also be used.

A multi-frame blending operation 326 receives the reference image frame 316, the one or more non-reference image frames 312b, and the motion maps 320 and 324. The blending operation 326 operates to combine the reference image frame 316 and the one or more non-reference image frames 312b based on the motion maps 320, 324. For example, values in the motion maps 320 and 324 may be treated as weights, where higher values are indicative that image data contributes more to a blended image and lower values are indicative that image data contributes less to the blended image (or vice versa). The output of the blending operation 326 is a blended image 328, which (ideally) has little or no motion blur as defined by the reference image frame 316 for any motion regions and larger image details and less noise as defined by the one or more non-reference image frames 312b for any stationary regions.

The blending operation 326 can use any suitable technique for combining two or more image frames based on motion maps, such as by using a weighted combination of pixel values from the image frames 312b and 316 (where the weights are defined by the motion maps). In some embodiments, the blending operation 326 can blend image data as follows:

$$Y_{blend} = (Y_1 * W_1 + \ldots + Y_n * W_n)/(W_1 + \ldots + W_n) \quad (1)$$

$$U_{blend} = (U_1 * W_1 + \ldots + U_n * W_n)/(W_1 + \ldots + W_n) \quad (2)$$

$$V_{blend} = (V_1 * W_1 + \ldots + V_n * W_n)/(W_1 + \ldots + W_n) \quad (3)$$

Here, $Y_1$-$Y_n$ represent luminance pixel values from n image frames 312b and 316 being combined, and $U_1$-$U_n$ and $V_1$-$V_n$ represent chrominance pixel values from the n image frames 312b and 316 being combined. Also, $W_1$-$W_n$ represent weights from the motion maps 320 and 324 associated with the n image frames 312b and 316 being combined. For five input image frames, for example, assume the third image frame has a shorter exposure time. In this example, $W_1$, $W_2$, $W_4$, and $W_5$ can represent the motion maps 320 associated with the non-reference image frames 312b, and $W_3$ can represent the motion map 324 associated with the reference image frame 316. In addition, $Y_{blend}$, $U_{blend}$, and $V_{blend}$ represent luminance and chrominance pixel values contained in a blended image 328. Note, however, that other blending operations may occur here.

The blended image 328 is provided to a contour reduction operation 330, which operates to estimate the likelihood of contour artifacts being formed and to apply contour reduction only in those regions of the blended image 328 where contour artifacts are likely. This helps to reduce the likelihood of contour reduction (which can decrease image quality) being applied in areas of the blended image 328 where it is not needed. This results in the generation of a processed blended image 332. In some embodiments, the contour reduction operation 330 estimates the likelihood of contour artifacts being formed by identifying any regions of the blended image 328 where one non-reference image frame 312b contributes much information to the blended image 328 while another non-reference image frame 312b does not. One example implementation of the contour reduction operation 330 is described below, although other implementations of the contour reduction operation 330 could also be used.

The processed blended image 332 can be subjected to one or more post-processing operations in order to further improve the quality of the blended image 332. For example, the processed blended image 332 can be subjected to noise filtering and edge enhancement operations 334, which operate to remove spatial noise and improve the sharpness of edges in the processed blended image 332. Various techniques for edge enhancement and noise filtering are known in the art. In some embodiments, the noise filtering can represent a multi-scale de-noising process that is guided by the motion maps 320, 324.

The output of the process shown in FIG. 3 is at least one final image 336 of a scene. The final image 336 generally represents a blend of the original image frames 304, 306, and 308 after processing. Ideally, the final image 336 has little or no motion blur in motion regions, where the amount of motion blur in the final image 336 depends primarily on the amount of motion blur contained in the original image frame 306. Also, ideally, the final image 336 has improved image details in stationary regions, which depends primarily on the amount of image details in the original image frames 304 and 308.

Figure 4:
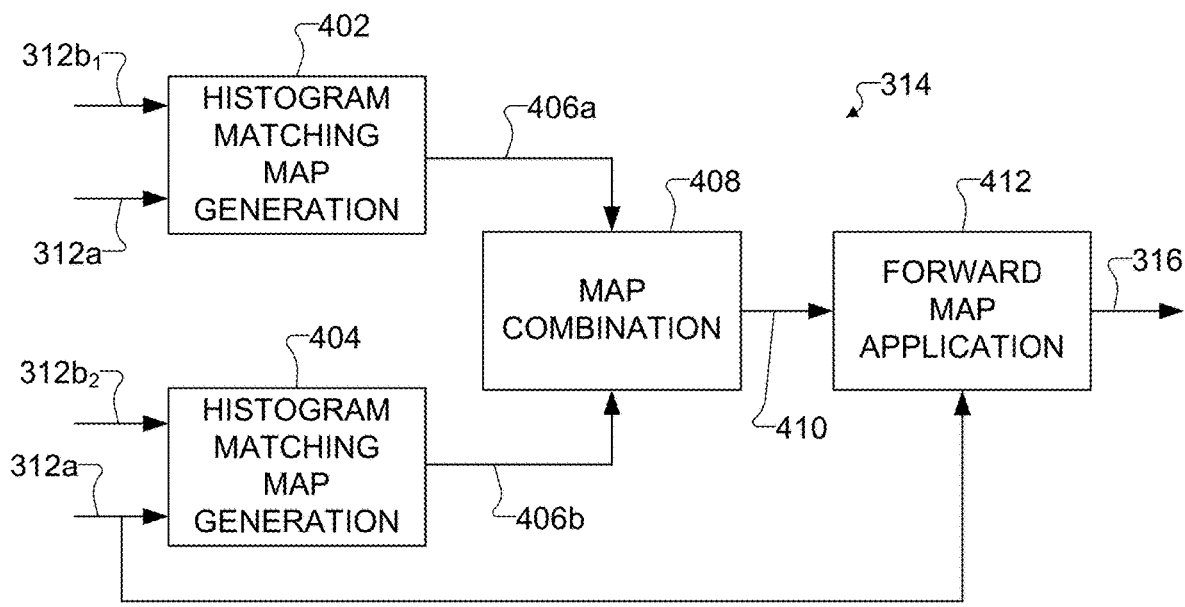
FIG. 4 illustrates an example process for performing a histogram matching operation in the process of FIG. 3 in accordance with this disclosure.

FIG. 4 illustrates an example process for performing a histogram matching operation 314 in the process of FIG. 3 in accordance with this disclosure. As shown in FIG. 4, the histogram matching operation 314 includes multiple histogram matching map generation operations 402 and 404. Each histogram matching map generation operation 402 or 404 generates a mapping from a source image frame to a target image frame. In this case, the source frame for both map generation operations 402 and 404 is the reference image frame 312a, and the target image frame in each map generation operation 402 and 404 is one of two non-reference image frames 312b (which are denoted as image frames 312b1 and 312b2 to distinguish between different non-reference image frames 312b). This results in the generation of multiple histogram maps 406a-406b, which represent multiple samples of the photometric relationships between the reference image frame 312a and the non-reference image frames 312b. Note that while two histogram matching map generation operations 402 and 404 are shown here as producing two histogram maps 406a-406b, this is based on the assumption that there are three image frames being processed (including two non-reference image frames). If there are more than two non-reference image frames, the histogram matching operation 314 could include more than two histogram matching map generation operations. Also, if there is only one non-reference image frame, the histogram matching operation 314 could include one histogram matching map generation operation. One example implementation of the histogram matching map generation operation 402 or 404 is described below, although other implementations of the histogram matching map generation operations 402 and 404 could also be used.

A map combination operation 408 receives the histogram maps 406a-406b and combines them into a single combined histogram map 410. The combination operation 408 may use any suitable technique to combine multiple histogram maps 406a-406b and generate a combined histogram map 410. In some embodiments, the combination operation 408 may determine the average of the histogram maps 406a-406b to generate the combined histogram map 410. Since the histogram maps 406a-406b generally represent monotonically-increasing functions, their average is also a monotonically-increasing function. Note, however, that other techniques could be used to combine multiple histogram maps. Also note that the histogram maps 406a-406b and the combined histogram map 410 may include both forward and reverse maps, where one map relates to a mapping of a first image frame to a second image frame and the other map relates to a mapping of the second image frame to the first image frame. Further note that if there is only one histogram matching map generation operation performed (such as when there is only one non-reference image frame being processed), the map combination operation 408 can be omitted or skipped, and the output of the histogram matching map generation operation 402 or 404 can be used as or in place of the combined histogram map 410.

The reference image frame 312a and the combined histogram map 410 are provided to a forward map application operation 412. The application operation 412 applies the combined histogram map 410 (or the forward map of the combined histogram map 410) to the reference image frame 312a in order to modify the reference image frame 312a and produce the pre-processed reference image frame 316. The application operation 412 may use any suitable technique to modify the reference image frame 312a based on the combined histogram map 410. In some embodiments, the application operation 412 uses a look-up table that maps original luminance and/or chrominance pixel values from the reference image frame 312a into new luminance and/or chrominance pixel values for the pre-processed reference image frame 316, where the look-up table is defined by the combined histogram map 410. The resulting pre-processed reference image frame 316 ideally has a histogram that more closely matches the histograms of the one or more non-reference image frames 312b, helping to more closely match the brightness and color of the image frames 312b and 316.

Figure 5:
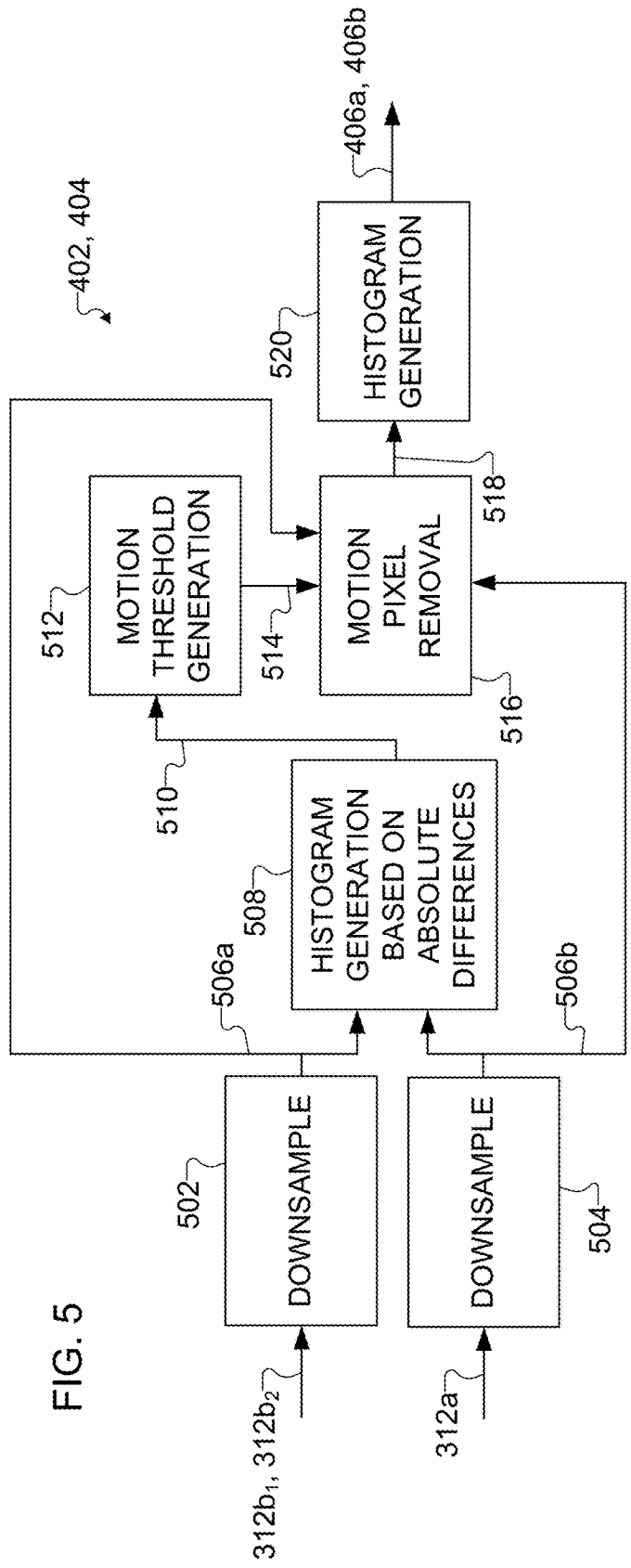
FIG. 5 illustrates an example process for performing a histogram matching map generation operation in the process of FIG. 4 in accordance with this disclosure.

FIG. 5 illustrates an example process for performing a histogram matching map generation operation 402 or 404 in the process of FIG. 4 in accordance with this disclosure. As shown in FIG. 5, input image frames (namely the reference image frame 312a and one non-reference image frame 312b) are provided to downsample operations 502 and 504, which downsample image data of the image frames to produce downsampled image frames 506a-506b. Any suitable amount of downsampling may be used here, such as downsampling to a half, a quarter, or an eighth of the original image data. Downsampling allows less image data to be processed in subsequent operations, which can help to speed up the subsequent operations. Since histogram map generation is a statistical operation, downsampling can be performed with little effect on the resulting histogram map that is generated. However, downsampling is not necessarily required here.

The downsampled image frames 506a-506b are provided to a histogram generation operation 508. The histogram generation operation 508 determines the absolute differences between the downsampled image frames 506a-506b (such as on a pixel-by-pixel basis) and generates a histogram 510 based on those absolute differences. The histogram 510 identifies how many times each absolute difference value appears between the downsampled image frames 506a-506b.

The histogram 510 is provided to a motion threshold generation operation 512, which processes the histogram 510 to identify one or more threshold values 514, such as a Y threshold, a U threshold, and a V threshold. Each threshold value 514 defines a point above which pixel values will be considered to correspond to motion pixels. In other words, the threshold values 514 can be used to identify which pixels in image frames are associated with one or more moving objects in a scene. The motion threshold generation operation 512 can use any suitable technique to identify the threshold values 514.

In some embodiments, the motion threshold generation operation 512 can generate thresholds for luminance and chrominance pixel values as follows:

$$Y_{MotTh}=C*\text{median}(\text{imhist}(\text{abs}(Y_{ref}-Y_{non\text{-}ref}))) \quad (4)$$

$$U_{MotTh}=C*\text{median}(\text{imhist}(\text{abs}(U_{ref}-U_{non\text{-}ref}))) \quad (5)$$

$$V_{MotTh}=C*\text{median}(\text{imhist}(\text{abs}(V_{ref}-V_{non\text{-}ref}))) \quad (6)$$

Here, imhist(abs($Y_{ref}-Y_{non\text{-}ref}$)) represents the values in the histogram 510 as generated by the histogram generation operation 508 based on luminance values of the image frames, and imhist(abs($U_{ref}-U_{non\text{-}ref}$)) and imhist(abs($V_{ref}-V_{non\text{-}ref}$)) represent the values in the histogram 510 as generated by the histogram generation operation 508 based on chrominance values of the image frames. Also, median(·) represents a function that determines the median value of the luminance or chrominance histogram values in the histogram 510 as generated by the histogram generation operation 508. In addition, C represents a multiplier used to define a multiple of the median at which point motion is assumed to be occurring. In some cases, the value of C may be three, although other positive real numbers may be used. Note, however, that the threshold values 514 may be determined in other ways, such as by using techniques that do not rely on some multiple of median values.

The downsampled image frames 506a-506b and the threshold values 514 are provided to a motion pixel removal operation 516, which operates to remove pixels from the downsampled image frames 506a-506b when those pixels have values exceeding their associated threshold values 514. In other words, the motion pixel removal operation 516 operates to remove or otherwise exclude pixels from consideration when those pixels are determined to be associated with motion. This results in the generation of processed downsampled image frames 518, which contain image data only associated with non-excluded pixels of the image frames 506a-506b not associated with motion. Pixels of the image frames 506a-506b associated with motion can be assigned a value of zero, which excludes those pixels from later use.

In some embodiments using the three threshold values 514 generated using Equations (4)-(6) above, the motion pixel removal operation 516 could determine whether any of the following conditions are met:

$$\text{abs}(Y_{ref}-Y_{non-ref})>Y_{MotTh} \quad (7)$$

$$\text{abs}(U_{ref}-U_{non-ref})>Y_{MotTh} \quad (8)$$

$$\text{abs}(V_{ref}-V_{non-ref})>Y_{MotTh} \quad (9)$$

If at least one of these conditions is met, the associated pixel can be excluded from consideration by the motion pixel removal operation 516. Note that, depending on the implementation, a pixel in an image frame may be removed if one, both, or all of the conditions in Equations (7)-(9) are met.

The processed downsampled image frames 518 are provided to a histogram generation operation 520, which generates one or more histogram maps 406a or 406b associated with the image frames 518. This involves creating one or more histograms of the pixel values from each processed downsampled image frame 518 and matching their count to establish a relationship between the two image frames. During the generation of the one or more histogram maps 406a or 406b, the histogram generation operation 520 is not considering any pixels associated with motion, since those pixels were removed previously. In some embodiments, the histogram generation operation 520 can generate forward and reverse maps for each channel (Y, U, and V) of the downsampled image frames 518.

Removing motion pixels greatly increases the robustness of the histogram map 406a or 406b. As shown in FIG. 4, to increase the robustness further, multiple histogram matching map generation operations 402 and 404 may occur using different non-reference image frames 312b (if available), and in some embodiments this may include one or more non-reference image frames 312b1 captured before the reference image frame 316 and one or more non-reference image frames 312b2 captured after the reference image frame 316. Ideally, the histogram maps 406a-406b generated from these image frames are identical, but realistically there are often minor divergences between the histogram maps 406a-406b in many scenes. Instead of using only one of them, the histogram maps 406a-406b can be combined, giving a more reliable mapping between the multiple non-reference image frames 312b and the reference image frame 316.

Figure 6:
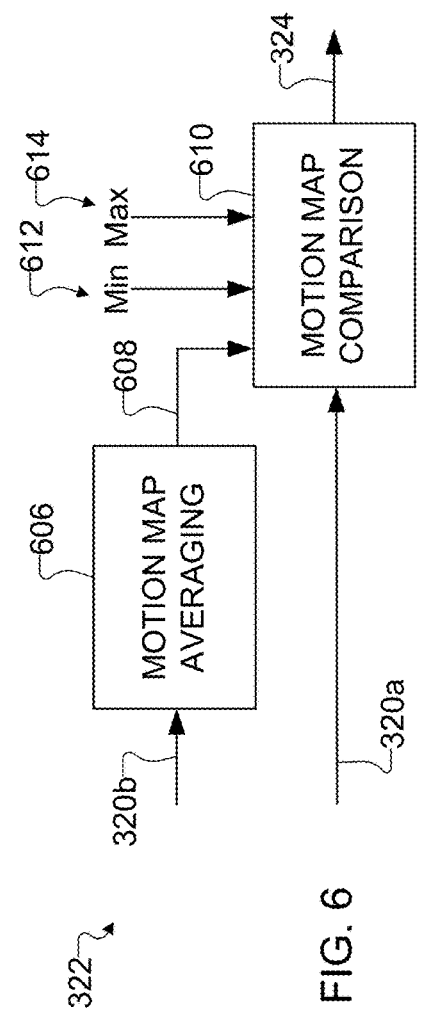
FIG. 6 illustrates an example process for performing a motion map post-processing operation in the process of FIG. 3 in accordance with this disclosure.

FIG. 6 illustrates an example process for performing a motion map post-processing operation 322 in the process of FIG. 3 in accordance with this disclosure. As described above, the motion maps 320 generated by the frame fusion operation 318 may include n motion maps for n image frames being combined. This includes one motion map 320 for the reference image frame 316 itself, which may be populated with values indicating no motion (since the reference image frame 316 compared to itself has no motion). This motion map is denoted as motion map 320a in FIG. 6. This also includes n–1 motion maps 320 for n–1 non-reference image frames 312b, where each of these motion maps 320 compares one non-reference image frame 312b to the reference image frame 316. These motion maps are denoted as motion maps 320b in FIG. 6. The motion map post-processing operation 322 evaluates the motion maps 320 to reduce the contribution of the reference frame 316 as much as possible to maximize noise reduction. In motion regions, the reference image frame 316 will still contribute the most, since the motion maps 320b for the non-reference image frames 312b will indicate the presence of local motion (which will limit or even eliminate their contribution to the blended image 328).

As shown in FIG. 6, the motion maps 320b for the non-reference image frames 312b are provided to a motion map averaging operation 602, which averages or otherwise combines the weights or other values contained in the motion maps 320b. This results in the generation of a combined motion map 604, which (ideally) provides a better measure of the overall motion level for every pixel in the non-reference image frames 312b. If there are five image frames being processed (one reference image frame 316 and four non-reference image frames 312b), this could involve the averaging operation 602 determining average values of the weights in the motion maps 320b as follows:

$$\text{NRMM}_{avg}=(W_1+W_2+W_4+W_5)/4 \quad (10)$$

where $\text{NRMM}_{avg}$ represents the average values of the weights $W_1$, $W_2$, $W_4$, and $W_5$ from the non-reference image frames' motion maps 320b. Note, however, that other techniques may be used to combine motion maps, rather than computing the average values.

The motion map 320a for the reference image frame 316 and the combined motion map 604 for the non-reference image frames 312b are provided to a motion map comparison operation 606. The motion map comparison operation 606 operates to adjust the values in the motion map 320a for the reference image frame 316 based on the combined motion map 604 for the non-reference image frames 312b to produce the post-processed motion map 324. For example, for any pixel identified as having little or no motion in the combined motion map 604, the motion map comparison operation 606 can minimize the contribution of the reference image frame 316 to the blended image 328. Conversely, for any pixel identified as having motion in the combined motion map 604, the motion map comparison operation 606 can maximize the contribution of the reference image frame 316 to the blended image 328. The minimization of the reference image frame 316 can be limited by a minimum threshold value 608, and the maximization of the reference image frame 316 can be limited by a maximum threshold value 610. The specific threshold values 608 and 610 that are used here can be adjusted in any suitable manner, such as based on image quality evaluation.

In some embodiments, the motion map comparison operation 606 can generate values in the post-processed motion map 324 as follows:

$$\text{RMM}_{upd}=\max[\text{Th}_{max}-\min(\text{NRMM}_{avg},\text{Th}_{max}),\text{Th}_{min}] \quad (11)$$

Here, $\text{RMM}_{upd}$ represents updated values that are contained in the post-processed motion map 324, $\text{Th}_{min}$ represents the minimum threshold value 608, and $Th_{max}$ represents the maximum threshold value 610. In particular embodiments, assume that the motion maps 320b for the non-reference image frames 312b contain pixel values ranging between 0 and 255 inclusive, and assume that the motion map 320a for the reference image frame 316 contains all pixel values of 255. The minimum threshold value 608 could be set to 32, and the maximum threshold value 610 could be set to 128. Thus, the pixel values in the post-processed motion map 324 will range between 32 and 128 inclusive.

It should be noted here that in some implementations, the values contained in the post-processed motion map 324 may not depend at all on the original values contained in the motion map 320a. For instance, Equation (11) above defines the $RMM_{upd}$ values in the post-processed motion map 324 based on the average values contained in the combined motion map 604 and the two threshold values 608 and 610, without reference to the original values contained in the motion map 320a. Therefore, in some embodiments, the frame fusion operation 318 may not generate the motion map 320a, and the post-processed motion map 324 can be generated by the motion map post-processing operation 322 based on the motion maps 320b produced by the frame fusion operation 318. However, other embodiments may be used in which the values of the motion map 320a are modified or otherwise considered when generating the post-processed motion map 324. Also, note that the motion maps 320b here are not modified, although other embodiments could be used where the motion maps 320b are modified by the motion map post-processing operation 322. In addition, it should be noted here that FIG. 6 assumes multiple non-reference image frames 312b are used to generate multiple motion maps 320b that are combined. If a single non-reference image frame 312b is being processed, the motion map comparison operation 606 can be omitted or skipped.

Figure 7:
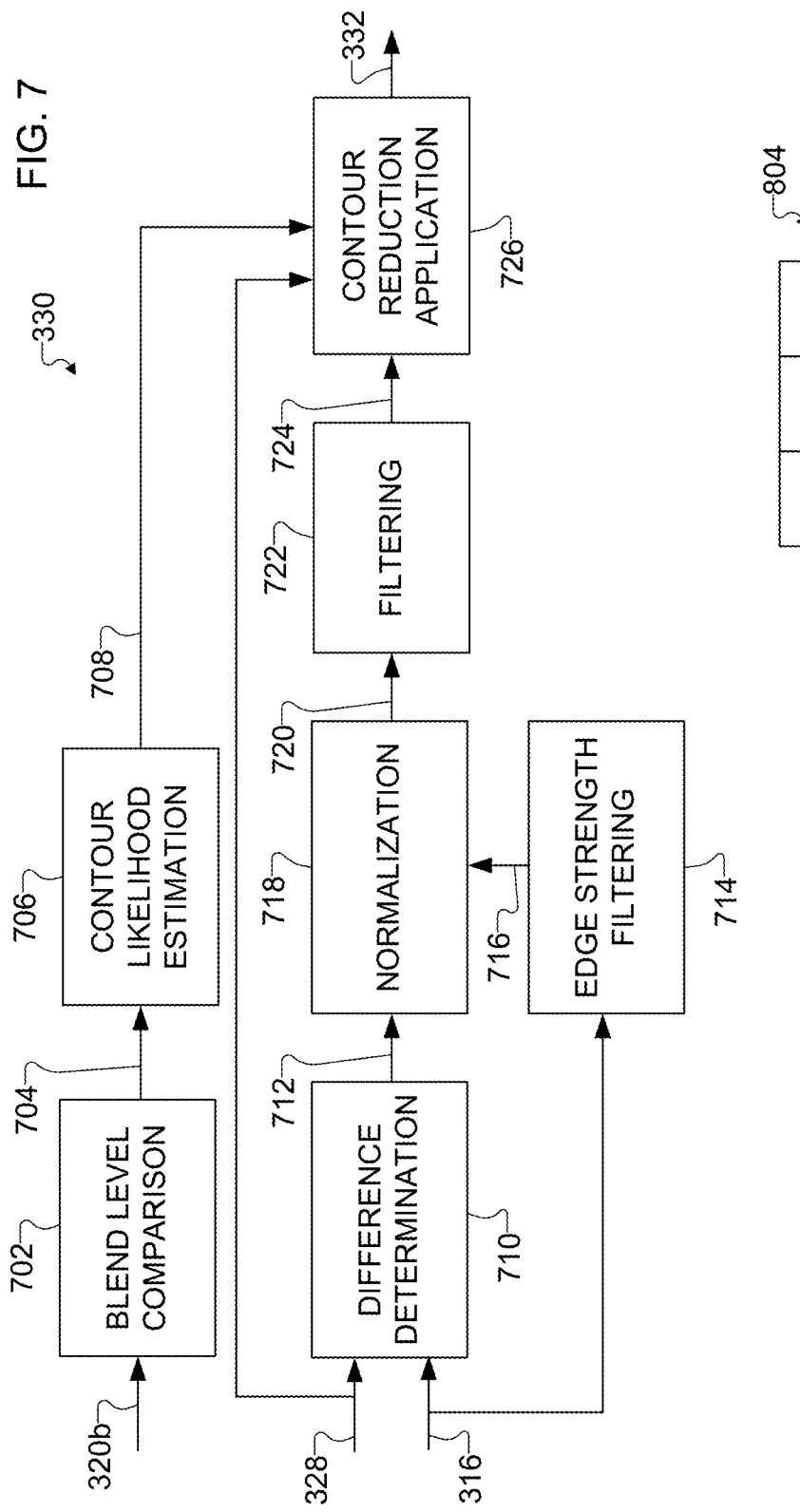
FIG. 7 illustrates an example process for performing a contour reduction operation in the process of FIG. 3 in accordance with this disclosure.

FIG. 7 illustrates an example process for performing a contour reduction operation 330 in the process of FIG. 3 in accordance with this disclosure. As described above, the contour reduction operation 330 estimates the likelihood of contour artifacts appearing and applies contour reduction only in those regions where contour artifacts are likely to appear (so that image quality is not affected in other areas of the blended image 328). As shown in FIG. 7, multiple motion maps 320b associated with multiple non-reference image frames 312b are provided to a blend level comparison operation 702. The blend level comparison operation 702 operates to compare the contributions of the different non-reference image frames 312b to the blended image 328, which is defined by or otherwise based on the motion maps 320b for the non-reference image frames 312b. The blend level comparison operation 702 can therefore compare the motion maps 320b and determine if one or more of the motion maps 320b indicate no motion while one or more other motion maps 320b indicate motion for a local region or pixel. This results in the generation of comparison levels 704, which identify (possibly on a per-region or per-pixel basis) whether the motion maps 320b consistently identify motion.

In some embodiments, the contour reduction operation 330 can process the motion maps 320b and generate the comparison levels 704 by identifying a ratio of contributions between the non-reference image frames 312b for each pixel as follows:

$$ContEq=max(MotMap)/[mean(MotMap)*NumMM] \quad (12)$$

Here, ContEq represents the ratio of contributions between the non-reference image frames 312b per region or per pixel, where this ratio has a relatively low value when the non-reference image frames 312b contribute equally to the blended image 328 and a relatively high value when the non-reference image frames 312b do not contribute equally to the blended image 328. The value of the ContEq ratio can also be zero when the motion maps 320b for the non-reference image frames 312b are consistently zero for that region or pixel. Also, max(MotMap) represents the maximum value per region or pixel in the collection of motion maps 320b, and mean(MotMap) represents the average value per region or pixel in the collection of motion maps 320b. In addition, NumMM represents the number of motion maps 320b being processed.

The comparison levels 704 are provided to a contour estimation likelihood operation 706, which analyzes the comparison levels 704 to determine whether the formation of contour artifacts is likely in any given pixel or region of the blended image 328. As noted above, the comparison levels 704 identify whether the motion maps 320b consistently identify motion. If the motion maps 320b do not consistently identify motion, confidence in blending the associated pixel or region is low, and the appearance of contour artifacts may be considered likely. Note that blending need not be disabled here, even if contour artifacts are likely to be formed. It has been discovered that contour signals are largely contained in the low-frequency luminance (Y) channel, so blending can be enabled, and contour artifacts can be reduced or minimized by filtering the luminance channel as described below. Thus, the contour estimation likelihood operation 706 can use the comparison levels 704 to identify situations in which the motion maps 320b do not consistently identify motion for pixels or regions of the blended image 328. This results in the generation of contour flags 708, which indicate whether or not contour artifacts are likely (such as on a per-pixel or per-region basis).

In some embodiments, the contour estimation likelihood operation 706 can process the comparison levels 704 to identify contour likelihood as follows:

$$CR_{en}=min[max((ContEq-CR_{offset}),0),CR_{thr}] \quad (13)$$

Here, $CR_{en}$ represents the likelihood of contour artifacts and can act as an enable signal for contour reduction. Also, $CR_{offset}$ is a tuning parameter related to an offset applied to the ratio of contributions between the non-reference image frames 312b. In addition, $CR_{thr}$ is a tuning parameter related to the minimum likelihood needed before a determination is made that contour artifacts are likely, which could have a value of 0.25 or some other positive real number.

The reference image frame 316 and the blended image 328 (or possibly just the luminance data from the reference image frame 316 and the blended image 328) are provided to a difference determination operation 710. The difference determination operation 710 operates to identify the differences between the luminance data in the reference image frame 316 and the blended image 328. This results in the generation of image differences 712, which effectively identify the Y channel update that was used to generate the blended image 328 as compared to the reference image frame 316.

The reference image frame 316 is also provided to an edge strength filtering operation 714, which operates to identify locations of edges of one or more objects in the reference image frame 316. This results in the generation of edge indicators 716, which can indicate whether each pixel or region of an image frame is associated with an object edge. The edge strength filtering operation 714 can use any suitable technique to identify locations of edges, such as by using the techniques disclosed in U.S. Patent Application Publication No. 2018/0192098 (which was incorporated by reference above). One example implementation of the edge strength filtering operation 714 is described below, although other implementations of the edge strength filtering operation 714 could also be used.

In some embodiments, the edge strength filtering operation 714 can generate the edge indicators 716 as follows:

$$ESFY_{ref}=\max[ESF(Y_{ref}), C_{esf}] \quad (14)$$

Here, $ESFY_{ref}$ represents the edge indicators 716. Also, $ESF(Y_{ref})$ represents the likelihood of an edge occurring in the luminance data of the reference image frame ($Y_{ref}$). In addition, $C_{esf}$ represents a tuning parameter, which in some embodiments could have a value of ten or some other positive real number.

The image differences 712 and the edge indicators 716 are provided to a normalization operation 718, which normalizes the image differences 712 based on the edge indicators 716. This results in the generation of normalized image differences 720. The normalization operation 718 allows the contour reduction operation 330 overall to avoid applying contour reduction in regions where edges of one or more objects in a scene are likely located (and where one would expect to find actual desired boundaries or contours in an image). In some embodiments, the normalization operation 718 can process the image differences 712 and the edge indicators 716 as follows:

$$Norm_{diff}=C_{esf}*Y_{diff}/ESFY_{ref} \quad (15)$$

Here, $Y_{diff}$ represents the image differences 712, and $Norm_{diff}$ represents the normalized image differences 720.

The normalized image differences 720 are provided to a filtering operation 722, which filters the normalized image differences 720 and produces filtered normalized image differences 724. The filtering operation 722 can help to remove high-frequency components from the normalized image differences 720 since, as noted above, contour artifacts may largely reside at lower frequencies in the luminance channel. Thus, the filtering operation 722 may perform a low-pass filtering operation or other filtering operation to remove high-frequency components from the normalized image differences 720. The filtering operation 722 may use any suitable filtering technique, such as when implemented using a 7×7 uniform filter. In some embodiments, the filtering operation 722 can process the normalized image differences 720 as follows:

$$Y_{diffLPF}=Norm_{diff}**LPF_{7\times7} \quad (16)$$

Here, $Y_{diffLPF}$ represents the filtered normalized image differences 724 after low-pass filtering, and $LPF_{7\times7}$ represents the function of the 7×7 uniform filter. Of course, it should be noted that other uniform, non-uniform, or other filters may be used here.

The blended image 328, the contour flags 708, and the filtered normalized image differences 724 are provided to a contour reduction application operation 726. The contour reduction application operation 726 uses the contour flags 708 and the filtered normalized image differences 724 to reduce or minimize contour artifacts in the blended image 328. For example, the contour reduction application operation 726 may subtract the filtered normalized image differences 724 (or scaled versions of the filtered normalized image differences 724) from the blended image 328, but only for pixels or regions identified by the contour flags 708 as likely having contour artifacts. This results in the generation of the processed blended image 332 or at least the luminance data for the processed blended image 332.

In some embodiments, the contour reduction application operation 726 can generate the luminance data for the processed blended image 332 as follows:

$$Y_{upd}=Y_{blend}-(Y_{diffLPF}*CR_{en}/CR_{thr}) \quad (17)$$

Here, $Y_{blend}$ represents the luminance data of the blended image 328, and $Y_{upd}$ represents the luminance data of the processed blended image 332. Here, a pixel or region of the blended image 328 matches the corresponding pixel or region of the processed blended image 332 if the $CR_{en}$ value is zero, and the low-frequency content of the processed blended image 332 is lower compared to the low-frequency content of the blended image 328 for pixels or regions where contour reduction was applied.

Figure 8:
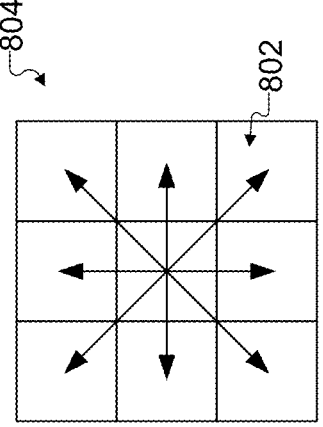
FIG. 8 illustrates an example edge strength filter for use in the process of FIG. 7 in accordance with this disclosure.

FIG. 8 illustrates an example edge strength filter for use in the process of FIG. 7 in accordance with this disclosure. In particular, the edge strength filter in FIG. 8 can be used by the edge strength filtering operation 714 in the process of FIG. 7. The edge strength filter generally operates to detect changes in the luminance values of adjacent pairs of pixels 802. These changes in luminance can indicate an edge or texture in an image frame. Here, the edge strength filter detects changes in the luminance values for various pairs of pixels 802 within a moving 3×3 window 804 of pixels. More specifically, the edge strength filter compares the pixels 802 in each set of two pixels that are opposite each other about the center pixel 802 in the window 804. This results in a comparison of pixels 802 along horizontal, vertical, and two diagonal axes in the window 804. Moreover, the window 804 of pixels can move to cover all or substantially all of an image frame to perform the luminance comparison over all or substantially all of the image frame.

In this way, the edge strength filter can detect an edge (defined by a large change in luminance values between the compared pixels 802) that is vertically, horizontally, or diagonally disposed within the window 804. This may be referred to as "orientation free" edge detection. In some embodiments, the comparison of pixels 802 is performed by summing the absolute values of the differences of the Y values of the pixels 802, and the resulting value is indicative of how strongly an edge is detected. Note, however, that any other suitable edge detection mechanism can be used here.

Although FIG. 2 illustrates one example of a process 200 for blending multiple image frames and FIGS. 3 through 8 illustrate examples of operations in the process 200 of FIG. 2, various changes may be made to FIGS. 2 through 8. For example, while shown as sequences of steps, various operations shown in FIGS. 2 through 8 could overlap, occur in parallel, occur in a different order, or occur any number of times. Also, the specific operations shown in FIGS. 3 through 8 are examples only, and other techniques could be used to perform each of the operations shown in FIGS. 3 through 8.

It should be noted that the operations shown in FIGS. 2 through 8 can be implemented in an electronic device 101 in any suitable manner. For example, in some embodiments, the operations shown in FIGS. 2 through 8 can be implemented or supported using one or more software applications or other software instructions that are executed by the processor 120 of the electronic device 101. In other embodiments, at least some of the operations shown in FIGS. 2 through 8 can be implemented or supported using dedicated hardware components. In general, the operations shown in FIGS. 2 through 8 can be performed using any suitable hardware or any suitable combination of hardware and software/firmware instructions.

It should also be noted that the operations shown in FIGS. 2 through 8 are described above as being performed using a specific implementation of the electronic device 101, but a number of modifications can be made based on the actual electronic device 101 being used. For example, the electronic device 101 could include or use a single camera or multiple cameras. If a single camera is used, multiple image frames of a scene could be captured sequentially, such as in one or more fast bursts. If multiple cameras are used, it may be possible to capture multiple image frames concurrently or in an overlapping manner, such as by capturing multiple image frames of a scene at the same time but with different camera exposure times using different cameras. Some specific examples of multi-camera setups include the use of wide and telephoto cameras, wide and mono-focal cameras, or wide, telephoto, and mono-focal cameras. Note that additional processing can occur to deal with baseline differences between the cameras. If needed, multiple image frames of the scene could still be captured sequentially using at least one of the multiple cameras. Assuming the geometry of the multiple cameras is known ahead of time, this geometry can be used to help align the image frames captured by the cameras or perform other functions. As another example, the electronic device 101 is described above as performing various operations using YUV image data. However, data in other domains (such as RGB or Bayer data) could also be used or processed. As a third example, the techniques described in this patent document could be combined with other image processing algorithms, such as in a software library used by the electronic device 101. This may allow a user of the electronic device 101 to select between different image processing algorithms, such as based on the specific situation or based on user preference. As a fourth example, the electronic device 101 can use the techniques described above to support the capture of still images or video sequences of scenes. The capture settings for a video sequence can be alternated to provide image frames with different exposure times, and a high-frame rate capture capability can help to mask frame rate reductions due to frame selection. As a fifth example, the electronic device 101 could include an inertial measurement unit as noted above, and the inertial measurement unit can provide input to the blending operation 208.

In addition, it should be noted that this disclosure has described both (i) multi-frame blending techniques and (ii) contour reduction techniques. However, there is no requirement that these techniques be used together in the same electronic device 101. An electronic device 101 could be used to implement either a technique for multi-frame blending or a technique for contour reduction (but not necessarily both). Of course, both techniques could also be implemented in the same electronic device 101.

Figure 9:
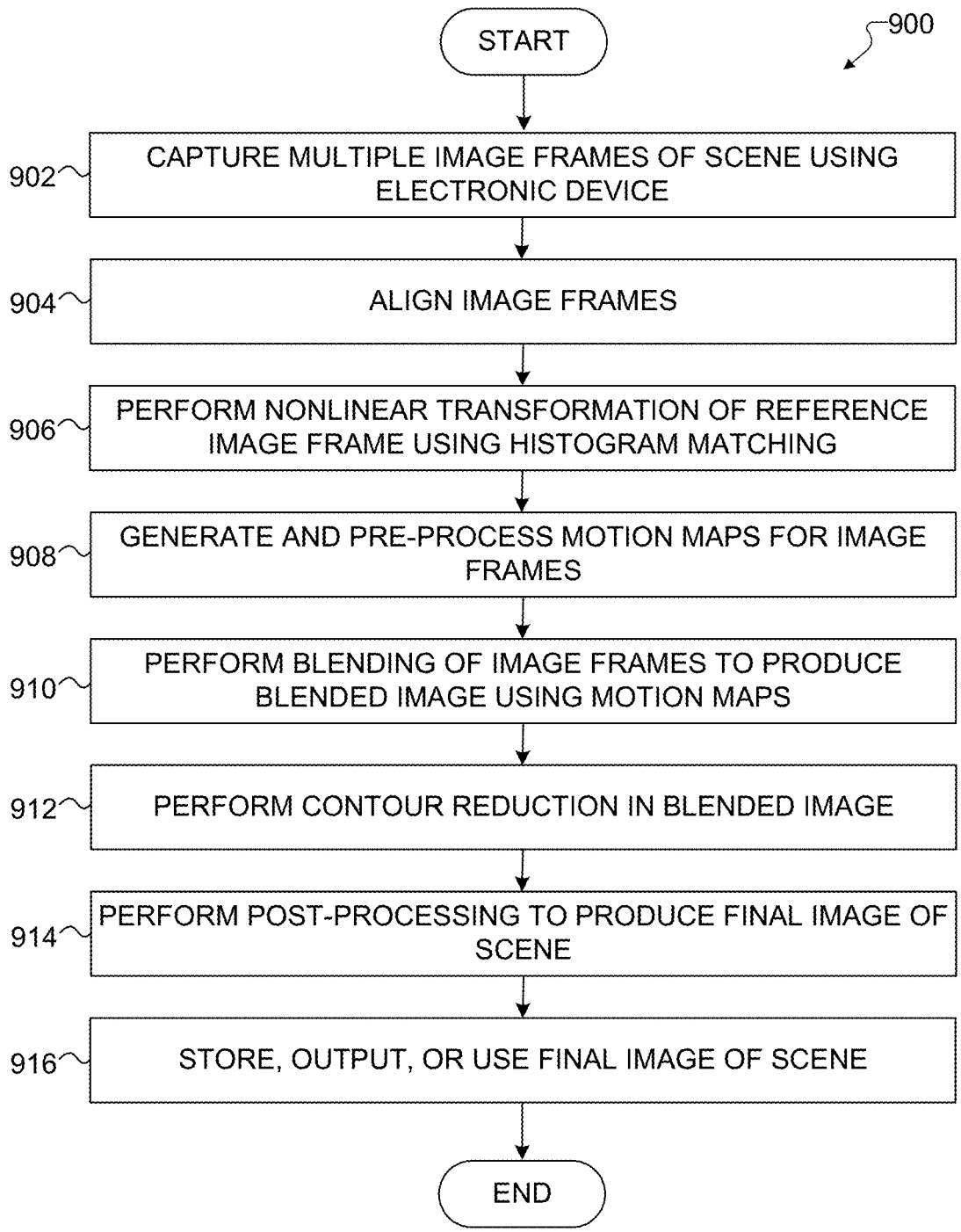
FIG. 9 illustrates an example method for blending multiple image frames captured using different exposure settings in accordance with this disclosure.

FIG. 9 illustrates an example method 900 for blending multiple image frames captured using different exposure settings in accordance with this disclosure. For ease of explanation, the method 900 shown in FIG. 9 is described as involving the use of the electronic device 101 of FIG. 1. However, the method 900 shown in FIG. 9 could be used with any other suitable electronic device and in any suitable system.

As shown in FIG. 9, multiple image frames of a scene are captured using an electronic device at step 902. This could include, for example, the processor 120 of the electronic device 101 receiving a capture request and causing the image sensor 202 to capture two or more image frames 304, 306, 308 of the scene with different exposure settings. The image frames that are captured here include at least one image frame 304, 308 generated using a longer exposure time and a lower sensitivity and at least one image frame 306 generated using a shorter exposure time and a higher sensitivity. The shorter-exposure image frame 306 will be used as a reference image frame, and the longer-exposure image frame(s) 304, 308 will be used as one or more non-reference image frames. In some embodiments, a ratio between the longer and shorter exposure times substantially matches a ratio between the higher and lower sensitivities so that the different image frames 304, 306, 308 have a substantially equal overall brightness. As noted above, there are various orders in which the image frames can be captured, such as by capturing the longer-exposure image frame(s) before and/or after the shorter-exposure image frame. Also, as noted above, multiple shorter-exposure image frames can be captured here, and one of the shorter-exposure image frames can be selected as the reference frame.

The image frames are aligned at step 904. This could include, for example, the processor 120 of the electronic device 101 aligning the one or more non-reference image frames 304, 308 with the reference image frame 306 in order to produce aligned image frames 312a-312b. A nonlinear transformation of the reference image frame is performed using histogram matching at step 906. This could include, for example, the processor 120 of the electronic device 101 generating one or more histogram maps 406a-406b, where each histogram map 406a-406b is generated based on the aligned reference image frame 312a and one aligned non-reference image frame 312b. If multiple non-reference image frames 312b are available, this could include the processor 120 of the electronic device 101 generating multiple histogram maps 406a-406b. This could also include the processor 120 of the electronic device 101 modifying the reference image frame 312a based on the histogram map(s) 406a-406b to more closely match the non-reference image frame(s) 312b, such as in brightness and color, to produce the pre-processed aligned reference image frame 316.

Motion maps identifying portions of the image frames that are prone to motion blur are generated and pre-processed at step 908. This could include, for example, the processor 120 of the electronic device 101 generating one or more motion maps 320b identifying differences (motion) between each of the one or more non-reference image frames 312b and the reference frame 316. This could also include the processor 120 of the electronic device 101 modifying the motion map 320a to generate the motion map 324 or the processor 120 of the electronic device 101 generating the motion map 324, in either case based on an average or other combination of the motion maps 320b (or based on a single motion map 320b if only one is available).

The image frames are blended using the motion maps to produce a blended image at step 910. This could include, for example, the processor 120 of the electronic device 101 blending the reference image frame 316 with the one or more non-reference image frames 312b to produce a blended image 328. Because of the prior steps that have occurred, the blending here generally combines regions of the one or more non-reference image frames 312b having little or no motion with regions of the reference image frame 316 containing motion. Ideally, this reduces or minimizes motion blur in the blended image 328 while increasing the image details and reducing noise in the blended image 328.

Contour reduction is applied to the blended image at step 912. This could include, for example, the processor 120 of the electronic device 101 identifying areas where the motion maps 320b do not consistently identify motion. This could also include the processor 120 of the electronic device 101 identifying filtered normalized differences between the reference image frame 316 and the blended image 328 in locations where edges are not expected based on the reference image frame 316. This could further include the processor 120 of the electronic device 101 subtracting the filtered normalized differences or scaled versions of the filtered normalized differences from the blended image 328 in locations where the motion maps 320b do not consistently identify motion to produce the processed blended image 332. Note that this form of contour reduction relies on the presence of multiple motion maps 320b for multiple non-reference image frames 320b, so this form of contour reduction might not be used in there is only a single non-reference image frame 320b. In that case, contour reduction could be omitted, or some other form of contour reduction can be used.

Any desired post-processing of the blended image occurs at step 914. This could include, for example, the processor 120 of the electronic device 101 performing spatial noise filtering and edge enhancement. The output of the post-processing is a final image of the scene, which can be stored, output, or used in some manner at step 916. This could include, for example, the processor 120 of the electronic device 101 displaying the final image of the scene on the display 160 of the electronic device 101. This could also include the processor 120 of the electronic device 101 saving the final image of the scene to a camera roll stored in a memory 130 of the electronic device 101. This could further include the processor 120 of the electronic device 101 attaching the final image of the scene to a text message, email, or other communication to be transmitted from the electronic device 101. Of course, the final image of the scene could be used in any other or additional manner.

Although FIG. 9 illustrates one example of a method 900 for blending multiple image frames captured using different exposure settings, various changes may be made to FIG. 9. For example, while shown as a series of steps, various steps in FIG. 9 could overlap, occur in parallel, occur in a different order, or occur any number of times. Also, it should be noted that in some cases, a longer-exposure image frame 304 or 308 might actually be clearer or have a better overall quality than the shorter-exposure image frame 306. This might occur, for instance, due to a sudden shake or other movement during capture of the shorter-exposure image frame 306. When the shorter-exposure image frame 306 is of insufficient quality (such as compared to some threshold or to the other image frames 304, 308), a longer-exposure image frame 304 or 308 might be selected as the reference frame.

Figure 10:
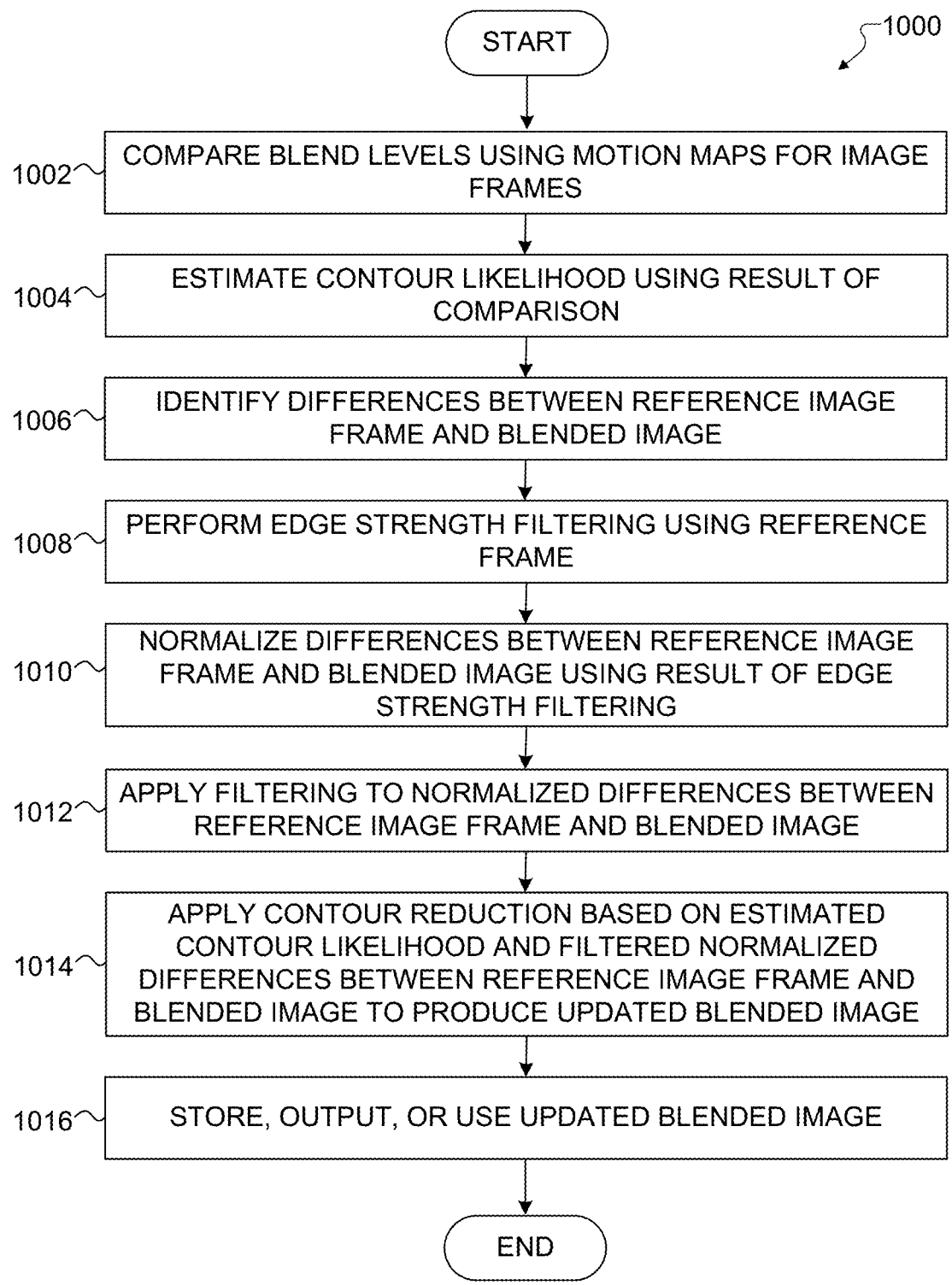
FIG. 10 illustrates an example method for contour reduction in a blended image in accordance with this disclosure.

FIG. 10 illustrates an example method 1000 for contour reduction in a blended image in accordance with this disclosure. For ease of explanation, the method 1000 shown in FIG. 10 is described as involving the use of the electronic device 101 of FIG. 1. However, the method 1000 shown in FIG. 10 could be used with any other suitable electronic device and in any suitable system.

As shown in FIG. 10, blend levels for multiple image frames are compared based on those image frames' motion maps at step 1002. This could include, for example, the processor 120 of the electronic device 101 comparing the motion maps 320b for the non-reference image frames 312b to one another in order to identify pixels or regions where the motion maps 320b do not consistently identify motion. As a particular example, this could include the processor 120 of the electronic device 101 generation ratios based on maximum and average values of the motion maps 320b, such as per-pixel or per-region. A likelihood of contour artifacts is determined using the results of the comparison at step 1004. This could include, for example, the processor 120 of the electronic device 101 comparing the ratios or other results of the previous comparison to identify pixels or regions where contour artifacts are likely.

Differences between a reference image frame and a blended image are identified at step 1006. This could include, for example, the processor 120 of the electronic device 101 identifying differences in at least the luminance data between the blended image 328 and the reference image frame 316. Edge strength filtering is performed using the reference image frame at step 1008. This could include, for example, the processor 120 of the electronic device 101 comparing pairs of pixels located opposite a central pixel in a moving 3×3 window in the reference image frame 316. The differences between the reference image frame and the blended image are normalized based on the results of the edge strength filtering at step 1010. This could include, for example, the processor 120 of the electronic device 101 dividing the differences in at least the luminance data between the blended image 328 and the reference image frame 316 by the likelihood that the differences are located at object edges. The resulting normalized image differences are filtered at step 1012. This could include, for example, the processor 120 of the electronic device 101 applying a 7×7 uniform filter or other filter to the normalized image differences. Ideally, this filters high-frequency components from the normalized image differences.

Contour reduction is applied to the blended image to produce an updated blended image at step 1014. This could include, for example, the processor 120 of the electronic device 101 subtracting the filtered normalized image differences or scaled versions of the filtered normalized image differences from the blended image 328, but only in locations where contour artifacts are likely (which is based on the comparison of the motion maps 320b associated with the non-reference image frames 312b). The updated blended image can be stored, output, or used in some manner at step 1016. This could include, for example, the processor 120 of the electronic device 101 displaying, storing, or transmitting the updated blended image. This could also include the processor 120 of the electronic device 101 performing any desired post-processing of the updated blended image, such as spatial noise filtering and edge enhancement.

Although FIG. 10 illustrates one example of a method 1000 for contour reduction in a blended image, various changes may be made to FIG. 10. For example, while shown as a series of steps, various steps in FIG. 10 could overlap, occur in parallel, occur in a different order, or occur any number of times.

FIGS. 11A and 11B illustrate an example result obtained by blending multiple image frames captured using different exposure settings in accordance with this disclosure. As shown in FIG. 11A, an image 1100 of a scene captured using a standard image capture technique includes two vehicles and a person on a bicycle. The vehicles are moving, and the image 1100 contains a significant amount of motion blur due to the movement of the vehicles. The motion blur is bad enough that it makes reading the license plates of the vehicles difficult if not impossible. As shown in FIG. 11B, an image 1102 of the same scene has been captured using the multi-exposure multi-frame blending techniques described above, such as one in which a shorter-exposure image frame is captured in between longer-exposure image frames. As can be seen here, the image 1102 contains less motion blur, and reading the license plates of the vehicles is now much simpler. Thus, the processes described above can be used to combine image frames captured with different exposure settings to effectively reduce motion blur and improve image details in the resulting blended image.

Although FIGS. 11A and 11B illustrate an example of results that can be obtained by blending multiple image frames captured using different exposure settings, various changes may be made to these figures. For example, these figures are merely meant to illustrate examples of the types of results that could be obtained using the approaches described in this disclosure. Obviously, images of scenes can vary widely, and the results obtained using the approaches described in this patent document can also vary widely depending on the circumstances.

Figure 12A:
FIGS. 12A and 12B illustrate an example result obtained by performing contour reduction for a blended image in accordance with this disclosure.
Figure 12B:

FIGS. 12A and 12B illustrate an example result obtained by performing contour reduction for a blended image in accordance with this disclosure. As shown in FIG. 12A, an image 1200 of a scene captured using a standard image capture technique includes a ceiling fan that is rotating. Since the ceiling fan is rotating and there is a generally-consistent background here, contour artifacts 1202 have been created in the image 1200. These contour artifacts 1202 cause the shadows of the ceiling fan's blades to appear as if they include multiple distinct sections, which is (usually) not the case with such shadows. As shown in FIG. 12B, an image 1204 of the same scene has been generated using the contour reduction techniques described above. As can be seen here, the image 1204 contains few if any contour artifacts in the shadows of the ceiling fan's blades, allowing the shadows to appear more natural against the generally-consistent background. Thus, the processes described above can be used to effectively reduce contour artifacts in blended images that are produced using multiple image frames.

Although FIGS. 12A and 12B illustrate one example of results obtained by performing contour reduction for a blended image, various changes may be made to these figures. For example, these figures are merely meant to illustrate examples of the types of results that could be obtained using the approaches described in this disclosure. Obviously, images of scenes can vary widely, and the results obtained using the approaches described in this patent document can also vary widely depending on the circumstances.

Although this disclosure has been described with reference to various example embodiments, various changes and modifications may be suggested to one skilled in the art. It is intended that this disclosure encompass such changes and modifications as fall within the scope of the appended claims.

What is claimed is:

1. A method for multi-frame blending, the method comprising:
   obtaining at least two image frames of a scene, one of the image frames associated with a shorter exposure time and a higher sensitivity and representing a reference image frame, at least one other of the image frames associated with a longer exposure time and a lower sensitivity and representing at least one non-reference image frame; and
   blending the reference and non-reference image frames into a blended image such that (i) one or more motion regions of the blended image are based more on the reference image frame and (ii) one or more stationary regions of the blended image are based more on the at least one non-reference image frame.

2. The method of claim 1, wherein a ratio between the longer and shorter exposure times substantially matches a ratio between the higher and lower sensitivities so that the image frames have a substantially equal overall brightness.

3. The method of claim 1, further comprising:
   selecting one of the at least one other of the image frames as the reference image frame in response to determining that the image frame associated with the shorter exposure time and the higher sensitivity is of insufficient quality.

4. The method of claim 1, further comprising:
   obtaining multiple image frames associated with the shorter exposure time and the higher sensitivity; and
   selecting one of the multiple image frames associated with the shorter exposure time and the higher sensitivity as the reference image frame.

5. The method of claim 1, wherein:
   the image frames comprise the reference image frame and multiple non-reference image frames; and
   the reference image frame is associated with a capture time that is positioned in between capture times associated with at least two of the non-reference image frames.

6. The method of claim 1, further comprising:
   generating the reference image frame by performing a nonlinear transformation of a reference input image frame based on at least one histogram associated with at least one non-reference input image frame.

7. The method of claim 6, wherein performing the nonlinear transformation comprises:
   generating different histogram maps based on the reference input image frame and different non-reference input image frames;
   wherein the histogram maps are generated by excluding motion pixels from consideration and generating the histogram maps based on non-excluded pixels.

8. The method of claim 7, wherein generating at least one of the histogram maps comprises:
   identifying absolute differences between pixel values from two of the input image frames;
   generating a histogram based on the absolute differences;
   identifying one or more motion threshold values based on the histogram;
   excluding any pixel from the two input image frames having at least one pixel value that exceeds at least one of the one or more motion threshold values; and
   generating the at least one histogram map based on pixels from the two input image frames that are not excluded.

9. The method of claim 1, wherein blending the reference and non-reference image frames comprises:
   generating multiple motion maps using the reference and non-reference image frames, the motion maps comprising (i) one or more first motion maps each associated with differences between the reference image frame and one of the at least one non-reference image frame and (ii) a second motion map associated with the reference image frame.

10. The method of claim 9, wherein:
    the image frames comprise the reference image frame and multiple non-reference image frames;
    the one or more first motion maps comprise multiple first motion maps; and
    the method further comprises generating the second motion map by:
        combining the first motion maps to generate a combined first motion map;

for pixels or regions where the combined first motion map indicates little or no motion is occurring, minimizing a contribution of the reference image frame to the blended image in the second motion map; and for pixels or regions where the combined first motion map indicates motion is occurring, maximizing the contribution of the reference image frame to the blended image in the second motion map.

11. The method of claim 1, further comprising:
applying contour reduction to the blended image to reduce contour artifacts in the blended image.

12. The method of claim 11, wherein:
the image frames comprise the reference image frame and multiple non-reference image frames; and
applying contour reduction comprises:
identifying where motion maps associated with the non-reference image frames do or do not consistently identify motion; and
identifying pixels or regions of the blended image in which to apply contour reduction based on where the motion maps do not consistently identify motion.

13. The method of claim 12, wherein applying contour reduction further comprises:
identifying image differences between at least luminance data associated with the reference image frame and with the blended image;
normalizing the image differences based on detected object edges in the reference image frame to produce normalized image differences;
filtering the normalized image differences to produce filtered normalized image differences; and
subtracting the filtered normalized image differences or scaled versions of the filtered normalized image differences from the blended image only for the identified pixels or regions of the blended image in which contour reduction is applied.

14. An electronic device comprising:
at least one image sensor; and
at least one processor configured to:
obtain at least two image frames of a scene using the at least one image sensor, one of the image frames associated with a shorter exposure time and a higher sensitivity and representing a reference image frame, at least one other of the image frames associated with a longer exposure time and a lower sensitivity and representing at least one non-reference image frame; and
blend the reference and non-reference image frames into a blended image such that (i) one or more motion regions of the blended image are based more on the reference image frame and (ii) one or more stationary regions of the blended image are based more on the at least one non-reference image frame.

15. The electronic device of claim 14, wherein a ratio between the longer and shorter exposure times substantially matches a ratio between the higher and lower sensitivities so that the image frames have a substantially equal overall brightness.

16. The electronic device of claim 14, wherein the at least one processor is further configured to select one of the at least one other of the image frames as the reference image frame in response to determining that the image frame associated with the shorter exposure time and the higher sensitivity is of insufficient quality.

17. The electronic device of claim 14, wherein the at least one processor is further configured to:

obtain multiple image frames associated with the shorter exposure time and the higher sensitivity; and
select one of the multiple image frames associated with the shorter exposure time and the higher sensitivity as the reference image frame.

18. The electronic device of claim 14, wherein:
the image frames comprise the reference image frame and multiple non-reference image frames; and
the reference image frame is associated with a capture time that is positioned in between capture times associated with at least two of the non-reference image frames.

19. The electronic device of claim 14, wherein:
the at least one processor is further configured to generate the reference image frame; and
to generate the reference image frame, the at least one processor is configured to perform a nonlinear transformation of a reference input image frame based on at least one histogram associated with at least one non-reference input image frame.

20. The electronic device of claim 19, wherein:
to perform the nonlinear transformation, the at least one processor is configured to generate different histogram maps based on the reference input image frame and different non-reference input image frames; and
to generate the histogram maps, the at least one processor is configured to exclude motion pixels from consideration and to generate the histogram maps based on non-excluded pixels.

21. The electronic device of claim 20, wherein, to generate at least one of the histogram maps, the at least one processor is configured to:
identify absolute differences between pixel values from two of the input image frames;
generate a histogram based on the absolute differences;
identify one or more motion threshold values based on the histogram;
exclude any pixel from the two input image frames having at least one pixel value that exceeds at least one of the one or more motion threshold values; and
generate the at least one histogram map based on pixels from the two input image frames that are not excluded.

22. The electronic device of claim 14, wherein:
to blend the reference and non-reference image frames, the at least one processor is configured to generate multiple motion maps using the reference and non-reference image frames; and
the motion maps comprise (i) one or more first motion maps each associated with differences between the reference image frame and one of the at least one non-reference image frame and (ii) a second motion map associated with the reference image frame.

23. The electronic device of claim 22, wherein:
the image frames comprise the reference image frame and multiple non-reference image frames;
the one or more first motion maps comprise multiple first motion maps;
the at least one processor is further configured to generate the second motion map; and
to generate the second motion map, the at least one processor is configured to:
combine the first motion maps to generate a combined first motion map;
for pixels or regions where the combined first motion map indicates little or no motion is occurring, minimize a contribution of the reference image frame to the blended image in the second motion map; and for pixels or regions where the combined first motion map indicates motion is occurring, maximize the contribution of the reference image frame to the blended image in the second motion map.

24. The electronic device of claim 14, wherein the at least one processor is further configured to apply contour reduction to the blended image to reduce contour artifacts in the blended image.

25. The electronic device of claim 24, wherein:
the image frames comprise the reference image frame and multiple non-reference image frames; and
to apply contour reduction, the at least one processor is configured to:
identify where motion maps associated with the non-reference image frames do or do not consistently identify motion; and
identify pixels or regions of the blended image in which to apply contour reduction based on where the motion maps do not consistently identify motion.

26. The electronic device of claim 25, wherein, to apply contour reduction, the at least one processor is further configured to:
identify image differences between at least luminance data associated with the reference image frame and with the blended image;
normalize the image differences based on detected object edges in the reference image frame to produce normalized image differences;
filter the normalized image differences to produce filtered normalized image differences; and
subtract the filtered normalized image differences or scaled versions of the filtered normalized image differences from the blended image only for the identified pixels or regions of the blended image in which contour reduction is applied.

27. A method for contour reduction, the method comprising:
obtaining a blended image that is generated by combining a reference image frame and multiple non-reference image frames;
identifying where motion maps associated with the non-reference image frames do or do not consistently identify motion relative to the reference frame;
identifying pixels or regions of the blended image in which to apply contour reduction based on where the motion maps do not consistently identify motion; and
applying contour reduction to the identified pixels or regions to produce a processed blended image.

28. The method of claim 27, wherein applying contour reduction comprises:
identifying image differences between at least luminance data associated with the reference image frame and with the blended image;
normalizing the image differences based on detected object edges in the reference image frame to produce normalized image differences;
filtering the normalized image differences to produce filtered normalized image differences; and
subtracting the filtered normalized image differences or scaled versions of the filtered normalized image differences from the blended image only for the identified pixels or regions of the blended image in which contour reduction is applied.

29. The method of claim 28, wherein identifying the image differences comprises identifying the image differences between the luminance data associated with the reference image frame and with the blended image, without identifying image differences between chrominance data associated with the reference image frame and with the blended image.

30. The method of claim 28, wherein filtering the normalized image differences comprises low-pass filtering the normalized image differences.

31. The method of claim 30, further comprising:
performing edge detection filtering to identify the object edges in the reference image frame.

32. The method of claim 31, wherein:
performing edge detection filtering comprises performing edge detection filtering using pixels in a moving 3×3 window; and
filtering the normalized image differences comprises filtering the normalized image differences using a 7×7 uniform filter.

33. The method of claim 27, wherein identifying where the motion maps associated with the non-reference image frames do or do not consistently identify motion comprises, for each pixel or region:
determining a ratio based on contributions of the non-reference image frames to the blended image frame; and
determining whether the ratio indicates that contour artifacts are likely to form based on a contour reduction threshold.

34. The method of claim 27, further comprising:
generating the blended image by combining the non-reference image frames and the reference image frame, the reference image frame associated with a shorter exposure time and a higher sensitivity, the non-reference image frames associated with a longer exposure time and a lower sensitivity.

* * * * *